United States Patent
Lewis et al.

(10) Patent No.: US 11,832,589 B2
(45) Date of Patent: Dec. 5, 2023

(54) ANIMAL COMMUNICATION ASSISTANCE SYSTEM

(71) Applicant: Wuffer, LLC, Rockford, MI (US)

(72) Inventors: Colleen Lewis, Rockford, MI (US); Jeff Lewis, Rockford, MI (US)

(73) Assignee: Wuffer, LLC, Rockford, MI (US)

( * ) Notice: Subject to any disclaimer, the term of this patent is extended or adjusted under 35 U.S.C. 154(b) by 197 days.

(21) Appl. No.: 17/165,965

(22) Filed: Feb. 3, 2021

(65) Prior Publication Data

US 2021/0251191 A1 Aug. 19, 2021

Related U.S. Application Data

(60) Provisional application No. 62/969,291, filed on Feb. 3, 2020.

(51) Int. Cl.
*A01K 15/02* (2006.01)
*A01K 27/00* (2006.01)

(52) U.S. Cl.
CPC ............ *A01K 15/02* (2013.01); *A01K 27/009* (2013.01)

(58) Field of Classification Search
CPC .............................. A01K 15/02; A01K 27/009
See application file for complete search history.

(56) References Cited

U.S. PATENT DOCUMENTS

| | | | | |
|---|---|---|---|---|
| 9,578,855 B2 * | 2/2017 | Sibbald | .................. | A01K 15/02 |
| 10,791,710 B1 * | 10/2020 | White | .................. | A01K 5/0114 |
| 11,439,124 B2 * | 9/2022 | Trottier | .................. | G09B 21/00 |
| 2009/0051548 A1 * | 2/2009 | Dundon | .................. | A01K 1/035 |
| | | | | 340/573.3 |
| 2012/0312247 A1 * | 12/2012 | Ebersole | ................ | A01K 15/02 |
| | | | | 340/573.3 |
| 2017/0079242 A1 * | 3/2017 | Mosley | .................. | G06F 3/165 |
| 2020/0154672 A1 * | 5/2020 | Paavilainen | ........... | A01K 15/02 |

OTHER PUBLICATIONS

Youtube Video titled "A Design Process with dogs and smell/sound based interactions", uploaded on May 25, 2015 by user "colombinary" . Retreived from url: https://www.youtube.com/watch?v=0rbbehxwEDw (Year: 2015).*
Amazon "RIBOSY Dog Training Buzzer—Recordable Button—Record & Playback Your Own Message to Train Your Dog". Date first made available: Jun. 11, 2019. Retreived from URL: https://www.amazon.com/dp/B07K9ZQG4K/ref=sspa_dk_detail_1?pd_rd_i=B094HT1XM5&pd_rd_w=2v0kE&content-id=amzn1.sym.dd2c6db7—(Year: 2019).*

* cited by examiner

*Primary Examiner* — Magdalena Topolski
*Assistant Examiner* — Edgar Reyes
(74) *Attorney, Agent, or Firm* — J. Kyle Komenda

(57) ABSTRACT

Data is received identifying an interaction by an animal with a communication device, where the communication device includes a plurality of scent elements, each of the plurality of scent elements includes a different respective different scent, and a combination of the scents of the plurality of scent elements produces a combined scent, where the combined scent implements a scent marker, and the interaction is based on the scent marker. A meaning associated with the scent marker is determined based on the interaction. A communication by the animal is determined based on the interaction based on the meaning. Communication data is generated to identify the communication.

15 Claims, 26 Drawing Sheets

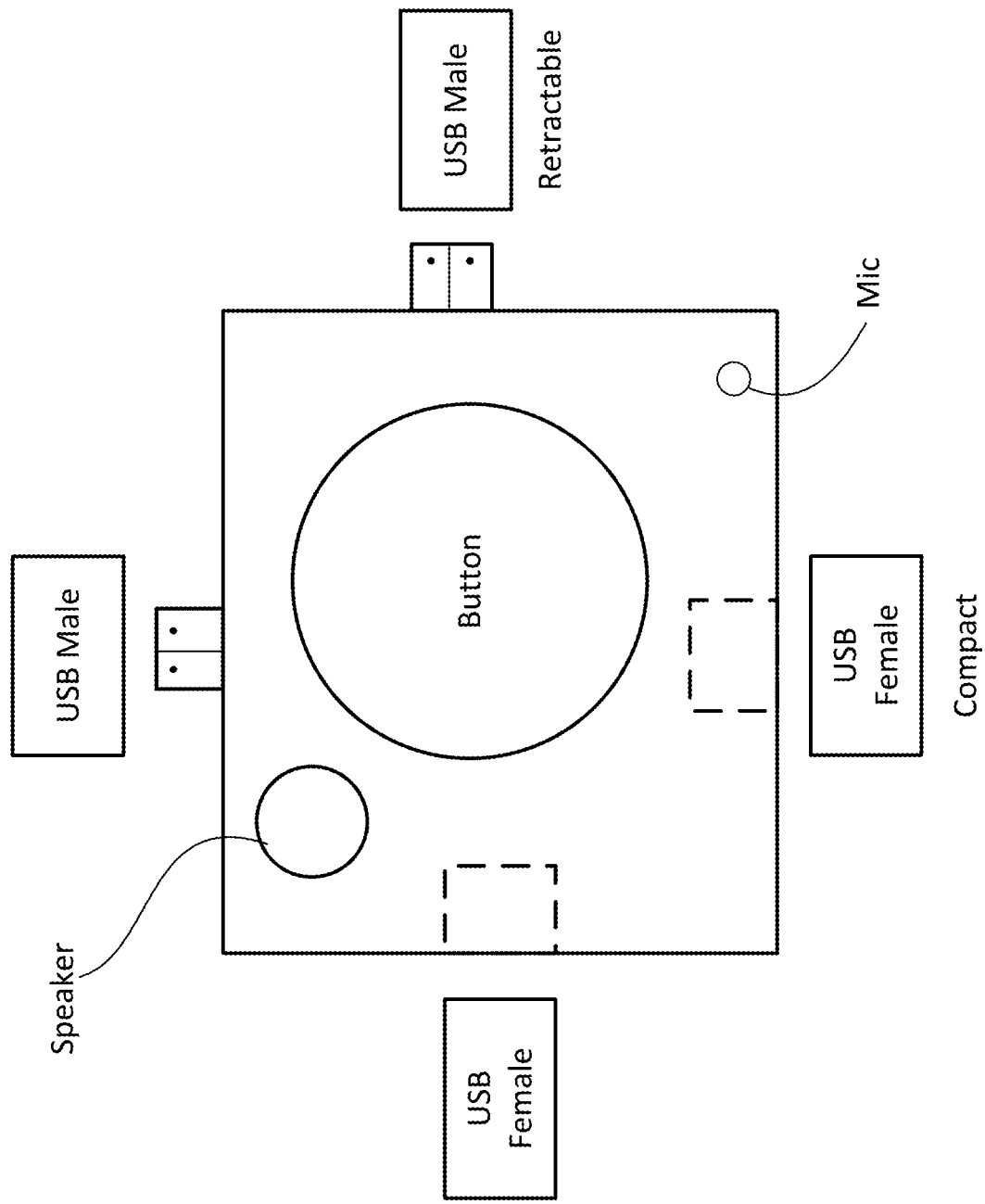

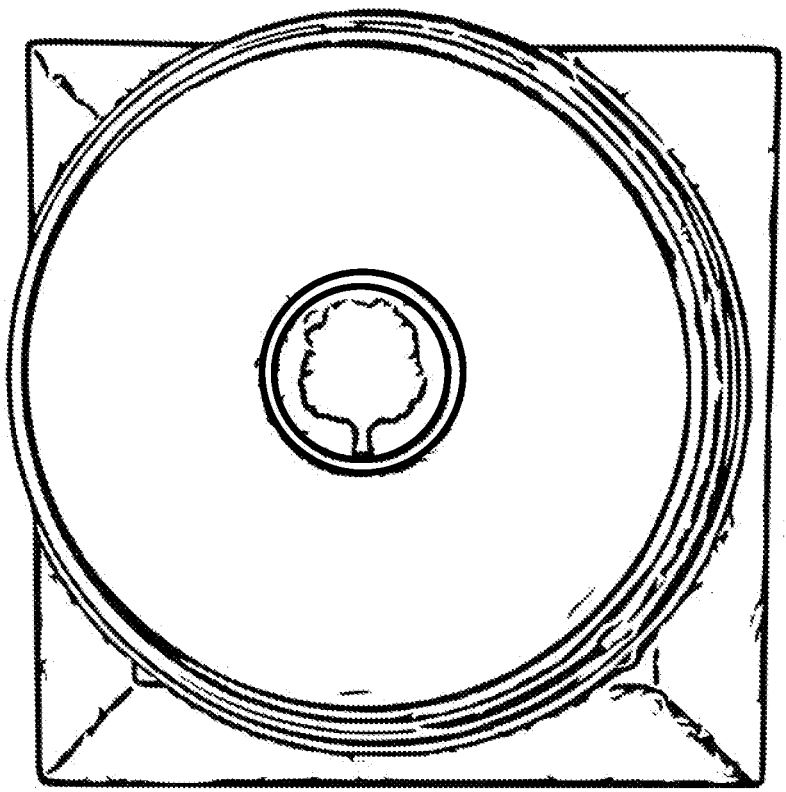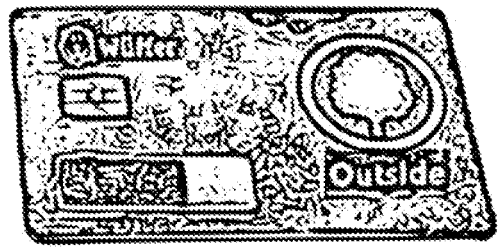
FIG. 17C

ANIMAL COMMUNICATION ASSISTANCE SYSTEM

This application claims the benefit of priority to U.S. Provisional Patent Application Ser. No. 62/969,291, filed Feb. 3, 2020, which is incorporated by reference herein in its entirety

BACKGROUND

The present disclosure relates in general to the field of animal training, and more specifically, to computer-aided systems for facilitating communication between animals and humans.

Throughout history, domesticated animals have been trained primarily by signal, voice, repetition and reward. This training protocol allows a human trainer to initiate communication, but involves limited animal-to-human initiation. While such traditional training techniques have been successful in training animals to lean a variety of commands, actions, and habits, it is difficult to appreciate the reaction and feedback felt or provided by the animal being trained using such techniques.

BRIEF SUMMARY

In some aspects of the present disclosure, data is received identifying an interaction by an animal with a communication device, where the communication device includes a plurality of scent elements, each of the plurality of scent elements includes a different respective different scent, and a combination of the scents of the plurality of scent elements produces a combined scent, where the combined scent implements a scent marker, and the interaction is based on the scent marker. A meaning associated with the scent marker is determined based on the interaction. A communication by the animal is determined based on the interaction based on the meaning. Communication data is generated to identify the communication.

A communication assistance system may include one or more computing devices, which may communicate with one or more communication devices in the system. The communication devices may detect that an animal has interacted with a particular device, where the particular device is one of a plurality of devices in an environment, the particular device includes a plurality of scent elements, where each of the plurality of scent elements includes a different respective different scent, and a combination of the scents of the plurality of scent elements produces a particular combined scent at the particular device, where the combined scent implements a scent marker associated with a meaning. The communication device, such as a wearable device (e.g., a collar or harness) or a button board, may additionally generate data to identify the detected interaction of the animal with the particular device and send the data to the computing device, where the computing device is to process the data to determine an attempted communication by the animal based on the interaction with the particular device, where the attempted communication incorporates the meaning. The system may additionally include a collection of communication devices, in some aspects.

BRIEF DESCRIPTION OF THE DRAWINGS

FIGS. 15A-15C are simplified block diagrams illustrating a modular button board device.

FIGS. 17A-17J illustrate example communication devices for use within an example communication assistance system.

Like reference numbers and designations in the various drawings indicate like elements.

DETAILED DESCRIPTION

Figure 1:
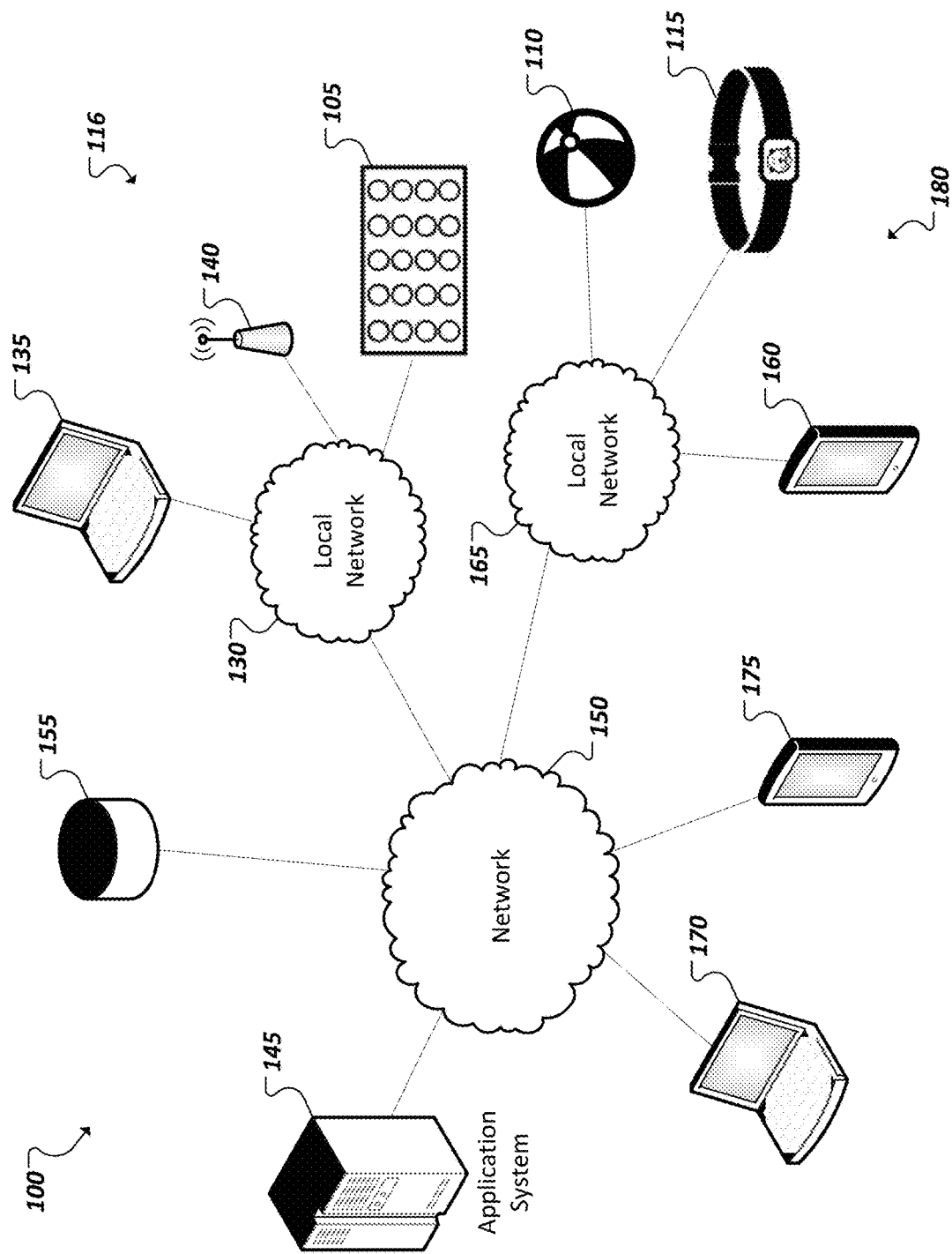
FIG. 1 is a simplified schematic diagram of an example communication assistance computing system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following:

a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium (e.g., a non-transitory storage medium) produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

A communication assistance system may include devices, which communicate information to a subject, such as a dog, cat, horse, or other animal, through olfactory stimuli (e.g., stimuli that may include multiple olfactory markers to communicate information, visual stimuli (e.g., static light, pulsing or strobe light, color, shape, augmented reality, virtual reality, and/or motion), audio stimuli (e.g., recorded or emulated voice (e.g., of the animal trainer or family member(s)) or other sounds, beeps, bells, buzzers, or any other sound or combination of sounds (including sounds above or below the human audio spectrum), tactile stimuli (e.g., shape, texture, material and/or vibration, wind, temperature fluctuations, liquid or humidity), gustatory stimuli (e.g., stimuli engaging taste receptors that may include, but is not limited to, licking, chewing), including devices conveying information to the animal through a combination of different stimuli. Such devices may be utilized in concert with companion user devices (e.g., hosting a software application providing feedback and/or a user interface for the trainer/teacher), such as laptop or desktop computers, smart phones, mobile devices, tablets, smart home controls, and other examples. Such devices and applications may function together to implement a training methodology to enhance the communication capabilities of the subject (e.g., animal) allowing pet owners and/or caregivers to utilize the provided technology to implement AAC practices or other established communications and behavioral practices utilizing an operant conditioning reward training protocol with methodology, rewards, training tips and encouragement, among other example features.

In some implementations, a communication assistance system may include a set of one or more communication devices, which provide a collection of stimuli to an animal and to which a human trainer assigns a meaning, such as a command, context, or behavior. The collection of stimuli may be regarded as a marker, and each marker may be assigned a meaning. The trainer may train the animal to associate the marker (and the corresponding collection of stimuli) with a particular meaning. Communication devices may include a single, multi functional stimulus marker, multiple stimuli markers, or a combination. The communication device may be programmed, for instance, by attaching or embedding a collection of olfactory stimuli (e.g., a collection of one or more fragrances provided through corresponding essential oils or other aromatic substances) to the device. In this manner, the device may be programmed with stimuli based on the intended meaning for the marker. In some cases, one or more devices in the system may be pre-programmed with specific stimuli (e.g., to provide an out-of-the-box collection of devices, each with unique fragrance combinations). In other examples, devices may be programmed and reprogrammed (e.g., through removable/replaceable fragrance elements, which may be selected and attached to each device by the human user/trainer). Stimuli of the marker may make up a combination of stimuli directed to a single type of stimulus, or a mix of stimulus types (e.g., olfactory and audio). For instance, a device may provide verbal queues (e.g., via a speaker in the device) in addition to olfactory stimuli, among other examples. In some implementations, a communication device may be equipped with functionality to provide feedback or reinforcement to the animal and/or trainer, for instance, in response to the animal's interactions with the device. For instance, a communication device may be configured to respond to touch, proximity, or other interactions with the device by the animal.

In some implementations, a device may be provided with multiple markers, such as in an implementation of a button board (e.g., utilizing a panel with multiple buttons, each with a respective marker). The buttons of the button board may be implemented as physical buttons (e.g., multiple raised, mechanical buttons), discrete subregions of a touch screen device, among other implementations. In one example, each button may be provided with a corresponding olfactory stimuli-based marker implemented, for instance, through scent-infused materials provided on or in the button region using scent-infused materials such as plastic, rubber, or silicon, scent reservoirs, absorbent pads, scented stickers, scented disks, cards, natural materials carrying a contributing scent, among other examples. An animal may touch or engage a respective button using its snout/nose, paw/hoof, etc. Use of the button board may follow training of the animal using the button board, with a trainer working to teach the animal to associate each scent provided at each button of the button board with a particular meaning (e.g., command, context, location, action, etc.). While a communication device, in some examples, may include multiple stimuli markers, such as in the case of a button board, other communication devices may be provided with a single stimuli marker (e.g., a toy, ball, beanbag, food or water dish, bed, or other item associated with a particular meaning. In some cases, such individual communication devices may be used in tandem with a button board, for instance, with one or more of the single-stimuli-marker devices having a stimuli-marker (e.g., a particular scent combination) that matches one of the stimuli markers of one of the multiple buttons of the button board, among other examples.

Some of the communication devices within an example communication assistance system may be provided with communication circuitry (e.g., antennae, wireless communication module, etc.) to enable the communication device to link wireless to and communicate with other computing devices, such as a user computing device used by a trainer, pet owner, etc. For instance, interactions with a particular communication device by the subject animal may be detected (e.g., using one or more embedded sensors on the device or a device attached to the animal (e.g., a smart collar)) may be detected and communicated wirelessly to the user computing device (which, in some cases, may include a corresponding application or program used within the communication assistance system) to collect data (e.g., for use in machine learning) and/or communicate the interaction to the associated human user. As an example, a button board may detect that a dog has pressed a particular one of a set of buttons on a button board that has a stimuli marker associated with playtime. The button board may communicate the pressing of the particular button to the user communication device, which may cause the user communication device to present an indication to the user that the dog desires to have play time, among other examples.

A communication device may connect to multiple devices (e.g., user communication devices, other communication devices, gateway devices, etc.). Communication between devices may be facilitated through various network communication technologies, such as Bluetooth, Wi-Fi, infrared, near-field communications (NFC), ZigBee, or other wireless communication technologies. The physical dimensions and functionality of the device may be developed in multiple shapes and configurations for varying degrees of use including, but not limited to the depth and scope of the intended training, the size and breed of the animal, the age and interest of emerging language student, the extent of physical or functional limitations, among other example considerations. An app may be provided, which may be installed on one or more other devices that are to cofunction with the communication devices, such as user computing devices (e.g., smartphones, tablet computers, etc.). The application may include functionality to identify and pair a host device with a communication device and even program the communication device, including settings and functions (e.g., transmit input criteria, response criteria) of the device. For instance, responses to be generated by the communication device, including the logic to be used by the communication device to determine which response to generate, may be programmed or otherwise specified using the application. For instance, an audio prompt, such as a command in the voice of the animal's trainer or owner, may be programmed and uploaded to the communication device using the application, among other examples.

The application may also be utilized to communicate with backend systems, for instance, to obtain updates, trained machine learning models, communication models, training program data and suggestions, user guides and tips, and other information, data, and logic, which may be utilized by the application to support the communication assistance system. Further, the application may also interface with backend servers or other computing devices to report data describing the training of animals and animals' use of the communication devices to a backend service (e.g., for use by the backend service to train machine learning models, for use in resolving help tickets, etc.). In this manner, the device hosting the application may function as a gateway or access point for data derived from the communication devices to be reported and shared with such services. In other instances, the communication devices may share this data more directly, for instance, through communication directly with wireless access points, smart home controllers, gateway devices, and other systems, among other examples.

Functionality of an application used to support communication devices and a communication assistance system more generally may include functionality such as logic to program and reprogram stimuli markers, manage individual or multiple communication devices, manage individual animals or trainers, linking communication devices to cofunction in a communication assistance system environment instance, recording and transmitting voice commands, recognition of stimuli responses, creating trainer notifications when stimuli responses are made, track and report client usage, measure and report specific stimuli marker usage, receive low battery or malfunction warnings from communication devices, pinging communication devices for location tracking (e.g., to identify a lost communication device), provide links to training tips including coaching support via video and list-based instructions, link to online community where trainers share tips, experiences and client accomplishments (e.g., as provided through a backend service), collect and manage data for client reward/recognition, among other examples.

Additional devices may also be included and used within a communication assistance system, such as cameras (e.g., used to monitor and track use and responses of animals to the communication devices (e.g., to infer meaning from animals' use of the communication devices based on patterns identified during monitoring of the animals' responses to the stimuli markers based on their training), virtual reality equipment, game controllers, alarms and timers (e.g., to convey timing or a "wait" command in response to a communication by the animal based on its interaction and use of a corresponding communication device), electronic security devices, locksets, light systems, electronic toys, internet of things devices (e.g., smart home features responsive to communication inputs detected through an animal's use of the communication devices), games and lifestyle devices, among other examples.

Training of an animal to use communication devices in a communication assistance system to enhance the communication between the animal and its human companions may include, but is not limited to established learning processes including operant conditioning, which is a learning process through which the strength of a behavior is modified by reinforcement or punishment (the basis of Pavlov's theory) and augmentative and alternative communication (AAC), which is used to provide nonverbal students a method of expressing their wants and needs. For instance, operant conditioning positive training methodology (e.g., developed by animal trainers using proven methods) may be utilized. Software applications and computing devices may be equipped with functionality and content to assist in the implementation of such training methodologies. More generally, a trainer may demonstrate expressive communication for the student and may test the receptive communication of a certain domestic animal ("student") through teaching the student to learn position, symbol, texture, shape, color, action, light, smell and/or taste of the stimulus marker on one or a set of communication devices when activated by a pre-determined signal in the training process. The student animal may be further taught to respond to activated stimulus marker by touching or otherwise interacting with the communication device stimulus marker with, but not limited to, its paw, snout, or mouth. The student animal may be thereby taught to spontaneously (e.g., responsive to the animal's autonomous desires, impulses, and feelings) to use the specific communication device stimulus markers to expressively communicate specific messages corresponding to the communication device or a combination of communication devices. Such interactions may be monitored to develop models of the communications between certain domestic animals and trainers. Animals of various species, breeds, sizes, and ages may be taught to use the communication assistance system. Multiple stimuli, using AAC methodology while implementing operant conditioning to incorporate incentive for positive behavior may shorten training time and increase communication capability.

Training may include encouraging the animal to perform a behavior with prompts that are paired with food, social praise or other reward when achieving desired behavior. Training may also include testing of the animal's receptive AAC understanding, which is demonstrated by activating a stimulus or stimuli on the communication device without voicing aloud the message or any other external cues. As an example, a pet may be taught that one or a combination of stimuli markers are to map to the concept "Outside, Frisbee" (e.g., which may be assumed to map to an animal's (e.g., dog) desire to play with a frisbee (e.g., which may be impregnated with an olfactory stimulus marker mapped to the concept of "Frisbee")). To test the animal's understanding, in one example, the trainer lights two buttons without voice, "Outside" and "Frisbee." If the dog understands the respond properly, the dog may respond, for instance, by retrieving a Frisbee and standing by the door after interpreting the stimulus correctly, among a multitude of other examples. In other cases, in addition to or as an alternative to visual cues, a communication device may provide vibratory feedback or auditory feedback, such as, a computer voice or natural voice that can include unique intonations or other sounds. Varied sensory element combinations may be tested for research into the communication systems of pets, providing the opportunity to test with auditory, visual and mixed stimuli including, but not limited to, smell, position, symbol, texture, shape, color, action, and/or taste for localization, among other examples.

FIG. 1 is a simplified block diagram 100 illustrating an example communication assistance system. A number of communication devices (e.g., 105, 110, 115) may be provided, which have stimuli markers that a trainer has mapped to certain meanings. For instance, a first communication assistance system instance 116 may interconnect a button board device 105 with other devices (e.g., 135, 140) over a local network 130. Other devices may include a user computing device (e.g., 135) and a gateway device 140. The computing device 135 or gateway device 140 may communicate over a wide area network 150 (e.g., the Internet) with one or more backend systems (e.g., 145) that host services (e.g., machine learning systems, social networks, training assistance programs, etc.) to support the functionality of communication assistance systems. Other communication assistance system instances (e.g., 180 using network 165) may include other combinations of devices, which a user (e.g., trainer) may select and use to train their animal. For instance, communication devices such as objects (e.g., 110) containing or infused with olfactory stimuli markers may be utilized together with an app on a user computing device (e.g., 160) and/or with an electronic smart collar 115 (or other device wearable by the student animal) that is configured to interoperate with various objects (e.g., 110), user computing devices (e.g., 160), button boards, or other devices within an example communication assistance system instance. Data may be collected (e.g., by gateway 140, an app on a user device 135, 160, etc.) describing animals' interactions and responses to communication devices within communication assistance system instances (e.g., 116, 180) and this data may be stored in one or more backend (e.g., cloud-based) repositories (e.g., 155), which may be accessed and utilized by backend systems (e.g., 145) and even local user computers (e.g., 135, 160) within communication assistance system instances. Other users (e.g., using other computing devices 170, 175 coupled to the systems via one or more networks (e.g., 150)) may utilize the communication assistance system. For instance, administrative users, professional trainers, help desk staff, etc. may also connect to and use the system. For instance, professional trainers, veterinary professionals, animal behavioralists, and other experts may provide information and assist in developing logic and data used by the system (e.g., backend services), for instance, by building training data (for machine learning models), building communication and/or behavioral models (e.g., which may be pushed down to client application instances for use in interpreting animal behaviors detected in local communication assistance system instances (e.g., 116, 180), among other examples.

Figure 2:
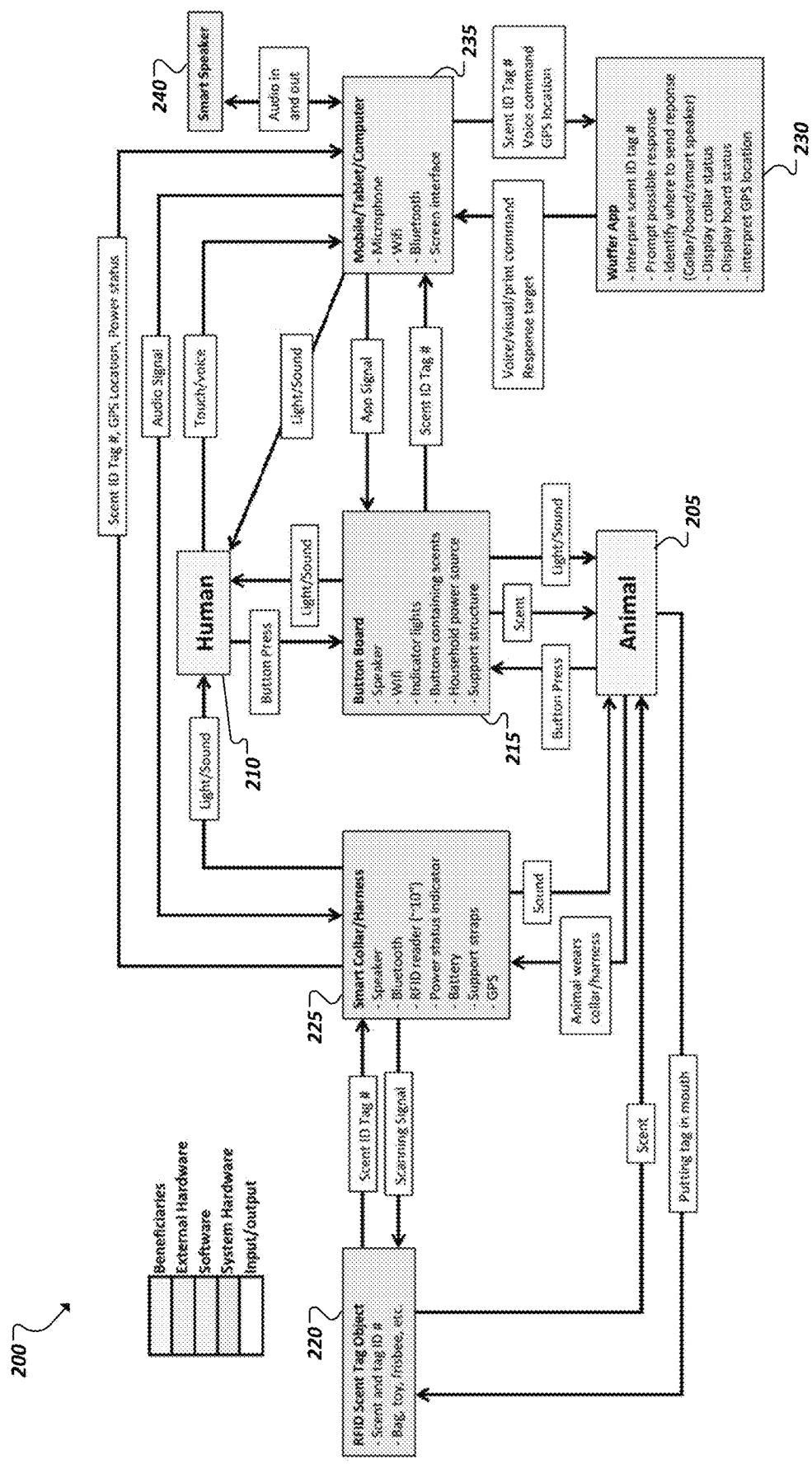
FIG. 2 is a simplified block diagram of an example communication assistance instance in accordance with at least one embodiment.

Turning to FIG. 2, a simplified block diagram 200 is shown illustrating an example communication assistance system instance. Users include at least one animal user 205 and at least one human user 210. A variety of communication devices may be provided within an environment, with which the animal 205 may interact to indicate desires, thoughts, or other expressions, based on prior training of the animal. The animal may be trained to associate specific stimuli markers (that are unique within the communication assistance system instance) with corresponding meanings. The communication devices may include a variety of communication objects (e.g., 220), which have respective scent-based stimuli markers. For instance, objects may include a ball, frisbee, or other toy with respective scents (or the same scent markers (e.g., a "play" scent marker)), a blanket, bed, tag (e.g., worn by humans or other animals in the household, tags hung on or at particular locations within the animal's environment (e.g., the location of the animal's "toilet," tags indicating a specific room, inside/outside, the car, etc.)), a food/water bowl, etc. Some objects may be implemented as a beanbag or other retrievable object, which the animal may pick up to indicate a particular desire. For instance, the animal may pick up a bag with a scent marker to indicate a particular idea and present this object to the animal's guardian or trainer. The bag or object (e.g., 220) may convey the meaning to the human user based on text or image on the object, the color of the object, the shape of the object, etc. For instance, if the animal is anxious, the animal may collect a beanbag or other object that has the words "anxious" or an emoji representing the feeling of the animal and present it to a human user. In some implementations, the human user may report the action of the animal based on its engagement with a particular object via an app (e.g., 230) on the user's smartphone or other user computing device (e.g., 235). This data may be collected locally and/or shared with a backend service supporting the app.

Interactions with an object (e.g., 220) may also be identified (and cataloged) automatically. In some implementations, a smart collar, harness, or other wearable device (e.g., 225) may be provided and worn by the animal 205. The wearable device 225 may include a sensor (e.g., an RFID scanner, camera, etc.) to detect that the animal 205 has engaged with a particular object 220 (e.g., based on the scent marker of that object and the animal's familiarity and association with that scent). For instance, the wearable device 225 may include an RFID reader and objects (e.g., 220) may include not only their particular scent marker, but also an RFID chip to identify the object. When the animal collects or otherwise interacts with the object, the RFID chip of the object may come within range of the RFID read in the wearable device 225 to cause the wearable device (e.g., after the object 220 is kept within range of the wearable device for a threshold amount of time (e.g., to avoid false positives of the animal rummaging through a collection of objects to select the one that best describes the animal's thoughts, desires, or feelings)) to determine the corresponding thoughts, desires, or feelings based on the animal's engagement with that object. The wearable device 225 may then facilitate communication of the corresponding thoughts, desires, or feelings to the human user 210. For instance, the wearable may include a speaker, lights, or a display to communicate the ideas to the human directly. Additionally or alternatively, the wearable device 225 may communicate wirelessly with other computing devices in the environment, such as a user computing device 235 hosting a supporting app 230, to indicate the animal's interaction with the object 220 (as detected by the wearable device 225), which the app 230 may interpret as mapping to a particular thought, desire, need, or feeling of the animal 205. The app 230 may then cause an alert to be presented on the user computing device or even cause instructions or requests to be sent to other devices within the environment (e.g., IoT devices to open doors, turn on lights, dispense food, activate a camera, activate a robotic vacuum (to clean up a mess left by the animal), etc.), among other example responses to the prompt from the wearable device 225.

In some cases, the wearable device 225 may also provide feedback to the animal 205 wearing the device. For instance, in response to engaging with a particular object to attempt to communicate, the wearable device 225 may detect the interaction and then present an audio, visual, or vibratory (e.g., through a vibrator on the wearable device) response to indicate feedback or a response to the animal's interaction with the object 220. For instance, prerecorded audio of the human's voice may be stored on the wearable device or in another system (e.g., a smart speaker 240) and presented as a response to the animal's interaction with the object. In another example, it may be necessary for the animal to wait for a response to an attempt to communicate through an interaction with an object 220. For instance, the animal may request to play with a frisbee (e.g., by collecting a frisbee which is marked with a corresponding RFID tag and scent marker). This request may be conveyed to the human user (e.g., via a prompt presented on the human's smartphone or via the wearable device). The human user may respond by telling the animal to "wait" or "later." The human user may engage a timer (or the timer may be activated automatically based on hearing the human's response) and cause a ticking sound or vibration to be presented to the animal (which the animal may be pre-trained to recognize as corresponding to a waiting period). When the timer expires, the ticking or vibration may end and/or be followed by an auditory or other alert to indicate to the animal that their original request is about to be granted (e.g., by the user or another system in the environment), among other examples.

In addition to interactions with communication objects 220, a button board (e.g., 215) may be additionally or alternatively provided for use in a communication assistance system. The button board may be provided with a set of buttons, each button having a respective scent marker corresponding to a pre-programmed and trained meaning. In some cases, objects and buttons may have the same meaning and provide alternative mechanisms for the animal to communicate the same meaning. The buttons on the button board 215 may be configured for use or engagement by the animal (e.g., via the animal's snout, paw, etc.) and may be provide audio, tactile, or visual feedback to the animal when engaged to indicate to the animal that the animal has successfully engaged the corresponding button. When the button is pressed, information corresponding to the meaning associated with that button may be presented to a human user 210. For instance, the button board 215 itself may generate an audio or visual presentation to indicate the thought, desire, feeling expressed by the animal 205 through it's touch of the button. Additionally or alternatively, the button board 215 may communicate wirelessly with the human's user computing device or other devices within the environment (e.g., a smart display, smart speaker (e.g., 240), or IoT device) to help convey the message and/or to activate other systems in the house (e.g., opening a door to allow the animal to go outside to use after the animal presses a "potty"

button on the button board 215), among other examples. The button board 215 may include multiple buttons with multiple options (corresponding to multiple scent markers) to allow the animal to convey one or a combination of meanings/ideas at a single location, among other example implementations.

As animals become more adept at using objects 220 and/or button boards 215 within an environment to communicate meaning, more complex "sentences" may also be composed by the animal by engaging with combinations of objects 220 and/or combinations of button boards (e.g., serially or in parallel) to convey multiple ideas. As animal communication differs from human communication, some of these combination expressions may not be immediately understandable by the human user. In other cases, such combination interactions may be pre-taught to the animal. In some implementations, logic provided within one or more of the devices in the communication assistance system, such as the button board 215, a gateway device, a user computing system 235, or a wearable device 225 may include one or more communication or behavioral model data structures, which the logic may use to predict a meaning of a sentence constructed by an animal. In addition to the specific interactions with the object, other data may be considered by the logic in predicting the expression the animal is attempting to convey. For instance, the location of the animal, the biometric measurements of the animal (e.g., as captured by the smart collar), noises or actions of the animal, and other inputs collected contemporaneously or before or after the animal's engagement with communication objects 220 and/or button board buttons may be collectively analyzed to determine an idea, request, or feeling of the animal 205. In some implementations, such models may constitute machine learning models, such as models trained using supervised and/or unsupervised machine learning techniques. Such learning may be based on training data collected within the environment (e.g., using the app 235, wearable device 225, other monitoring devices within the environment (e.g., cameras or other sensors), etc. Data collected from use of the communication assistance system may also be shared with backend systems, which may have the benefit of collecting information from multiple different communication assistance systems, to build robust machine learning models and/or training data to improve the logic used (e.g., and pushed down to local communication assistance system and app instances) to predict what an animal is trying to communicate from its use of the communication devices within the environment, among other example features and functionality.

Figure 3:
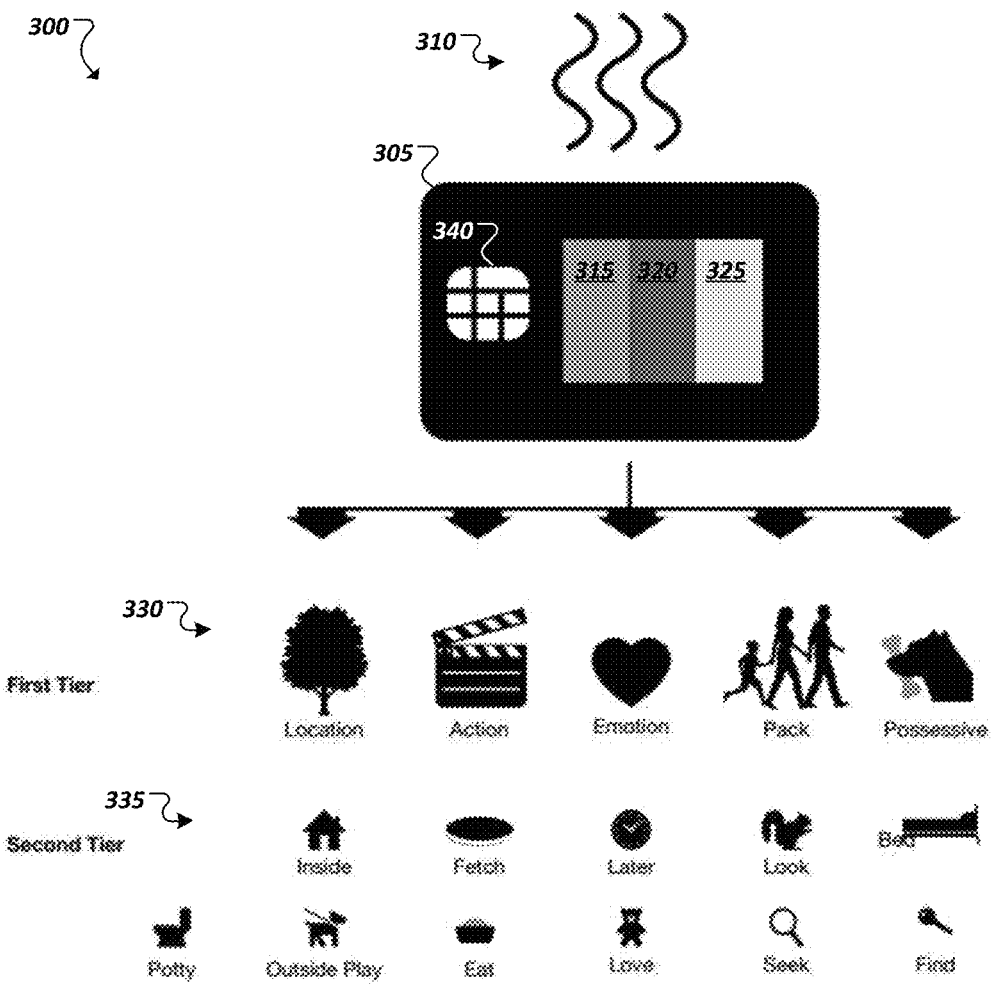
FIG. 3 is a simplified block diagram illustrating an example scent marker device in accordance with at least one embodiment.

Turning to FIG. 3, a diagram 300 is shown of an example scent marker device 305. In some implementations, scent marker devices 305 may be provided, which may be inserted or otherwise attached to a variety of different communication objects. The scent marker device 305, in some implementations, may be provided with a specific scent marker and an identifier, which may be expressed via an RFID chip (e.g., 340), QR code, or other computer readable identifier. The scent marker device 305 may be impregnated with or include a combination of scent containers, strips, or holders (e.g., 315, 320, 325), which combine to provide a multi-stimuli marker, or scent 310, of the device 305. An application, gateway, user device, wearable device, or other system elements may be programmed to associate the identifier (e.g., as conveyed using RFID chip 340) with a particular meaning or combination of meanings (or sentence), such that when the scent marker device 305 is identified (e.g., by a RFID reader on a smart collar worn by an animal) the corresponding expression (e.g., thoughts, desires, question, feeling, etc.) is determined from the animal's engagement with an object or button coupled to or containing the scent marker device 305. For instance, the scent marker device 305 may be inserted into the body of an object/button, a pocket of the object/button, attached to the object or button via an adhesive (e.g., an adhesive backing on the scent marker object), etc. to effectively attach the corresponding scent to the object.

In some implementations, the combination of scents (e.g., 315, 320, 325) provided on the scent marker object may be based on a hierarchical language paradigm. For instance, strips of absorbent material 315, 320, 325 (e.g., felt, silicon, etc.) may each be impregnated with or contain a respective scent (e.g., embodied by a respective essential oil or other aromatic substance). In some examples, the scents may be related, with one of the scents representing a category of ideas and another one of the scents representing a more specific concept within that category of ideas. As one example, categories or first tiers 330 of scent profiles may be defined, under which specific concepts, or second tiers 335, are defined. For instance, a strip 320 may include a scent corresponding to "Pack" (or the members of the animal's household) at the first tier and further include another strip 325 with a scent that indicates an action such as "Look" or "Seek". For instance, if the combination of scents (e.g., on strips 320, 325) on the scent marker device 305 map to "Pack" and "Seek", engagement of the animal with an object or button attached to the scent marker device 305 may map to a desire by the animal to find a member of the animal's family (e.g., seeking a member of its pack). Accordingly, an app, smart collar, and/or button board receiving this input may determine this expression from the animal's engagement with this scent marker device, among many other examples. In some examples, a third strip (e.g., strip 315) may include a scent to generally indicate that the object (to which the scent marker device 305 is attached) is a communication device, with which the animal may effectively interact with to express itself within the communication assistance system (as other objects and things within the animal's environment may not be so equipped). For instance, in one example system, each scent marker used within the system may include the "system scent" in addition to one or a combination of other additional scents to assist the animal in identifying, one, that the object is part of the system and can be used by the animal to communicate a meaning, and two, identify the specific meaning(s) that would be communicated were the animal to engage with the object or button.

Figure 4:
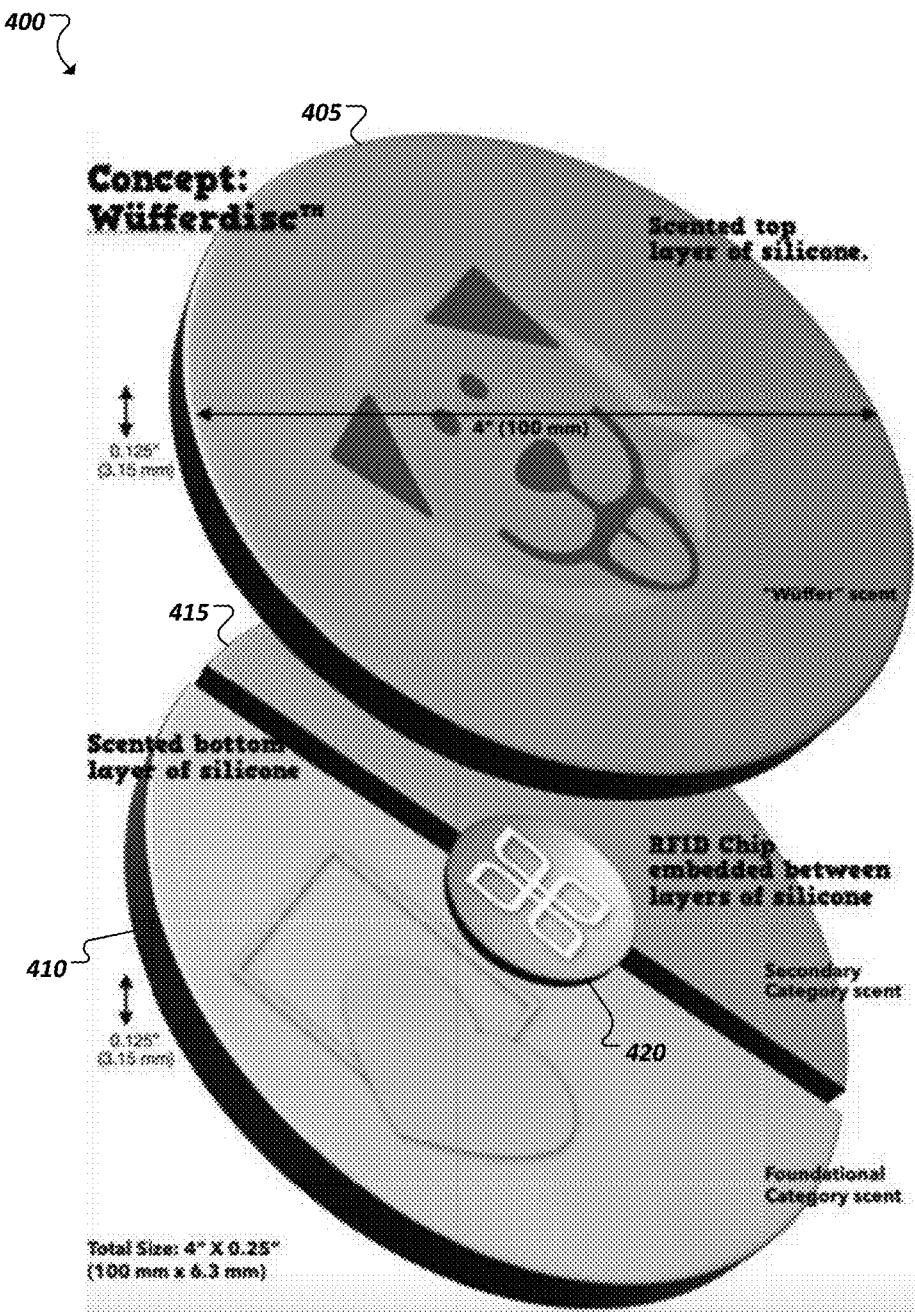
FIG. 4 is a simplified block diagram illustrating another example scent marker device in accordance with at least one embodiment.

FIG. 4 is another example of a scent marker device, such as a device composed of three (or more) scented layers or pieces (e.g., 405, 410, 415), each including a respective one of a combination of scents used to build the scent marker of the device. An RFID chip 420 may also be provided (e.g., between the scented layers), among other examples.

Figure 5:
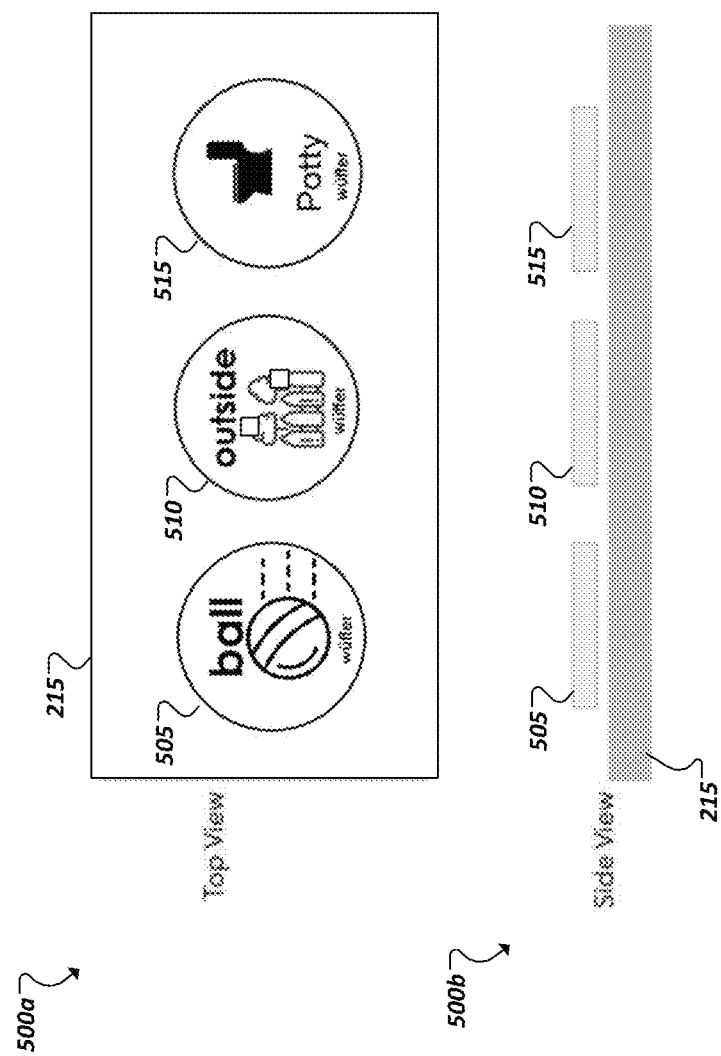
FIG. 5 shows views of an example button board device.

FIG. 5 is a simplified block diagram illustrating front 500a and side 500b views of a simplified button board. The button board 215 may include a collection of buttons (e.g., 505, 510, 515), with each button having a respective scent marker (e.g., provided through an attached scent marker device). In some examples, the buttons may also include human-readable images or symbols to help the human user remember which buttons correspond to which ideas. As the animal presses respective buttons (based on recognizing a corresponding scent marker the animal associates with a corresponding meaning or expression), the button board may respond, for instance, by generating feedback for the animal (e.g., via a sound, light, etc.) and/or the human user, at the board (e.g., by illuminating the pressed button, generating an announcement through a speaker on the board, etc.). A button board, in some implementations, may also connect, via one or more networks, to other devices to assist in communicating the animal's button press(es). For instance, data may be sent from the button board to a user device, a smart speaker, IoT gateway or hub, or other device to communicate that the animal pressed a button or a combination of buttons on the button board. For instance, the animal may press both a button 505 with a scent associated with playing and a button 510 with a scent associated with being outside (e.g., pressing the buttons in succession within a defined time window to indicate that the two meanings are to be understood as related or contemporaneous), which the button board 215 logic (e.g., implemented via software or hardware logic), the human's smartphone app, or other system element may interpret as the animal's request to go outside and play. This determination may cause additional data to be communicated within the network to cause an alert, such as a display or sound on the smartphone, a smart collar, a smart speaker, etc. to be presented for the benefit of a human user (who will let the animal outside and play with the animal), among other examples.

In some examples, logic utilized to identify and determine meaning from an animal's (e.g., 605) interactions with a button board 215 (or collection of communication objects) may be provided through an app on a smartphone or other user computing device 235. The user computing device 235 may also communicate with backend services (e.g., via the Internet) to obtain assistance from the backend service in processing and interpreting the interactions of the animal 605 with objects and/or button boards within its environment. For instance, as illustrated in the simplified block diagram 600 of FIG. 6, an animal 605 may press a particular button 625 of a button board 215 associated with a particular scent marker, causing the button board 215 to communicate data 615 (e.g., over a ZigBee communication channel) to an associated user computing device 235. Logic (e.g., an associated app) on the device may interpret the input(s) communicated by the button board 215 to determine a communication by the animal. The user computing device 235 may then communicate back (at 620) to the button board 215 to indicate the determination or interpretation of the button press(es) to cause the button board 215 to generate a response 630 (e.g., using audio or visual display capabilities at the button board 215). Such implementations may be advantageous, for instance, by allowing a particular communication assistance system instance to be programmed in a customized manner to the training/communication goals of that animal/user/family and the particular environment, allowing varying combinations of scent markers and associated meanings to be programmed into a button board, which may be reused or deployed in multiple different environments (e.g., with different combinations and layouts of scent-based buttons), among other example features and advantages.

Figure 7:
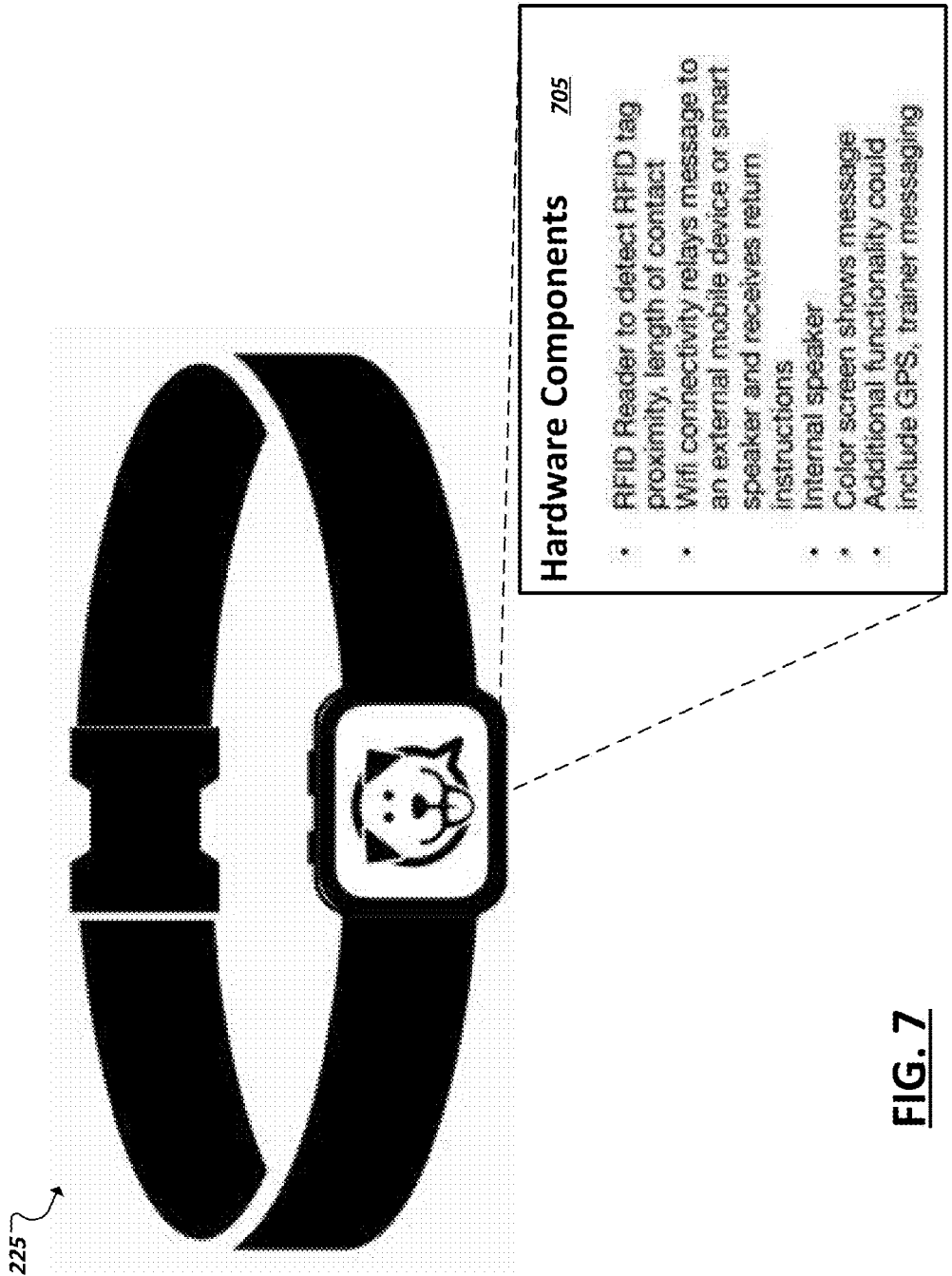
FIG. 7 is a simplified diagram of an example wearable device for use in a communication assistance system.

FIG. 7 is a simplified block diagram representing an example wearable device, such as a smart collar. The smart collar may be provided with a collection of hardware elements, firmware, and sensors (collectively summarized as components 705), to allow the smart collar to detect an animal's interactions with communication devices (e.g., objects and buttons with associated scent markers and RFID chips) within an environment. The smart collar, in some implementations, may also include a speaker to allow interpreted events, feelings, thoughts to be articulated in human language from the speaker to emulate speech by the animal wearing the collar 225. For instance, if the animal approaches and lingers near a water dish object with a scent marker device with a scent mapped to a desire to drink, the RFID reader within the collar 225 may identify the RFID and either communicate the interaction to another computer for processing, or process identification of the "desire to drink" RFID to generate an announcement at the collar's speaker of an alert such as the speech "I am thirsty, please give me water" or similar. Indeed, a collar may be programmed to speak a variety of human sentences in a variety of voices or accents (e.g., a Swiss accent for a Bernese mountain dog, or a French accent for a French bulldog, etc.), among other charming and fun enhancements.

Figure 6:
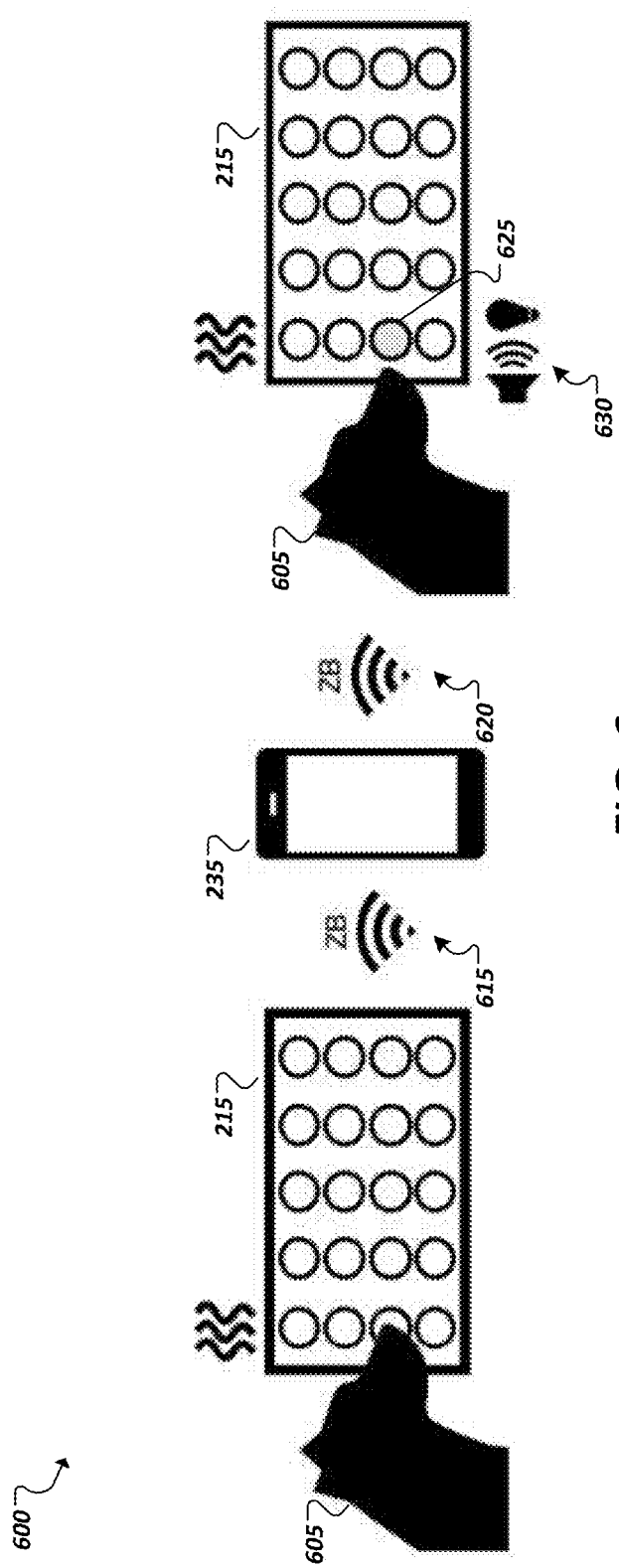
FIG. 6 is a simplified block diagram illustrating example use of a button board device by an animal.
Figure 8:
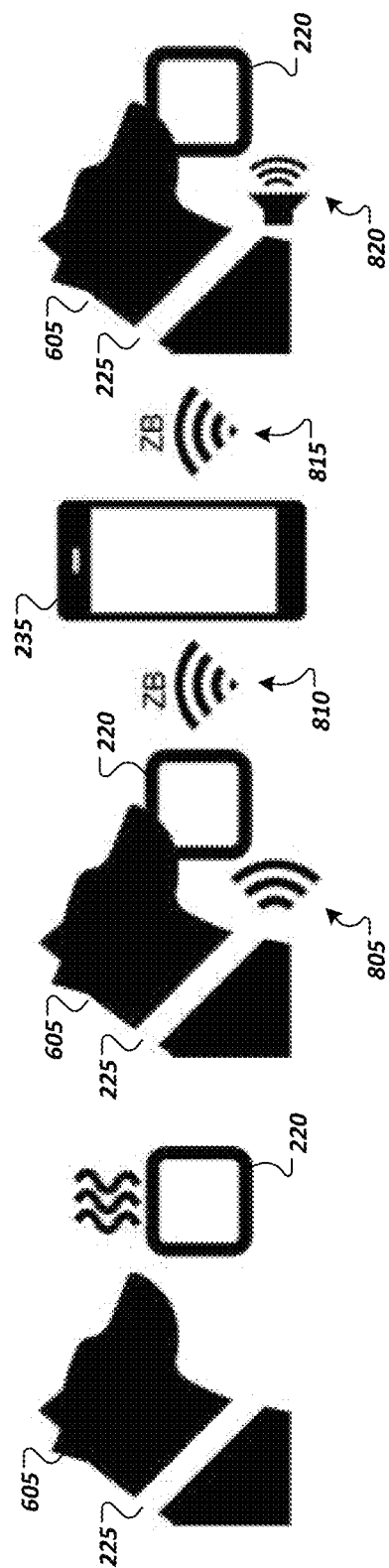
FIG. 8 is a simplified block diagram illustrating example use of a wearable device in a communication assistance system.

Turning to FIG. 8, similar to the example of FIG. 6, logic of a wearable device, such as a smart collar 225, may be enhanced or supplemented by the logic embodied in a supporting computing device, such as a user computing device (e.g., a smartphone with a communication assistance system app installed thereon), a gateway device, a controller system, or other computer, which may communicate with the wearable device 225 via a network. In the example of FIG. 8, an animal 605 wearing the smart collar wearable device 225 may desire to express itself using an object 220 within the communication assistance system. The animal 605 may identify the appropriate object 220 (which includes the corresponding scent marker and an RFID tag mapped to scent marker) that has been pre-associated with a particular meaning or expression within the system and may engage or interact with the object. Engagement or interaction may involve the object being brought within range of the collar 225 by virtue of the animal carrying the object 220 in its mouth for threshold amount of time, among other example implementations. The collar 225 may detect 805 the interaction and identify the interaction to a supporting computing device (e.g., 235) via a network communication 810. Logic of the supporting computing device 235 (or a cloud-based service to which the computing device 235 has access) may determine an intended communication of the animal 605 based on the animal's interaction with the object 220 (and potentially a combination of other interactions or actions (or context of the animal's interaction(s)) and communicate a response or instruction based on this determined communication back to the smart collar 225 (via network communication 815). The logic of the smart collar 225 may take the data received from the supporting computing device 235 as an input and act upon this input to generate a response using the hardware of the collar 225 (e.g., an audio, vibratory, visual, or other presentation mechanism). For instance, the collar 225 may generate an auditory message 820 for the benefit of the animal (e.g., congratulatory feedback or praise) and/or the human user(s) (e.g., a spoken pronouncement of the determined communication), among other example alerts and results. For instance, in response to picking up a ball object (with an associated scent marker and RFID tag), the animal's engagement with the ball may cause the computing device 235 to interpret the interaction as the animal's desire to play ball and may cause the collar 225 to generate a spoken message 820 of "I want to play ball. Can you play with me?", among other examples.

Figure 9:
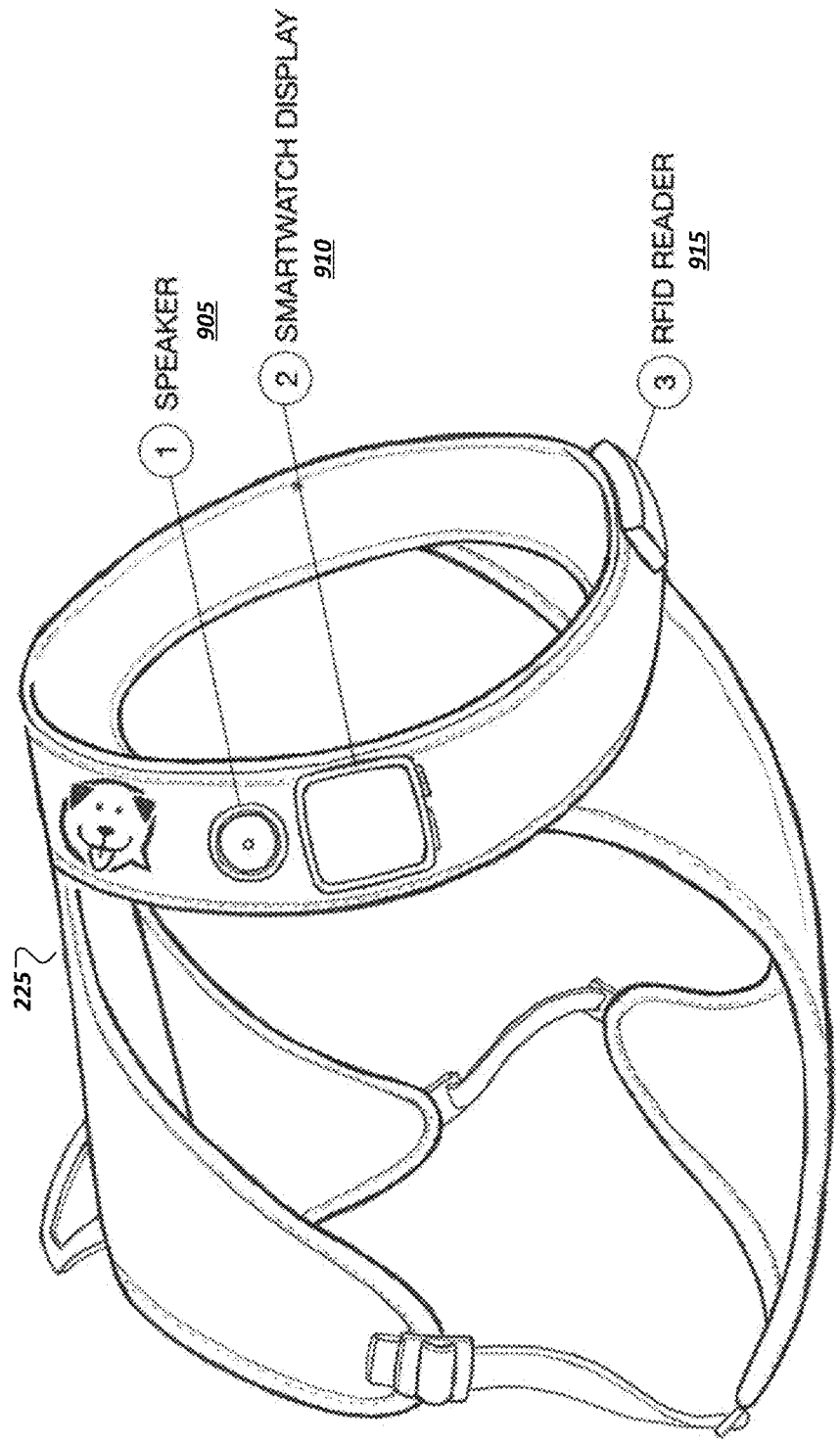
FIG. 9 is a diagram illustrating an example embodiment of a wearable device.
Figure 10:
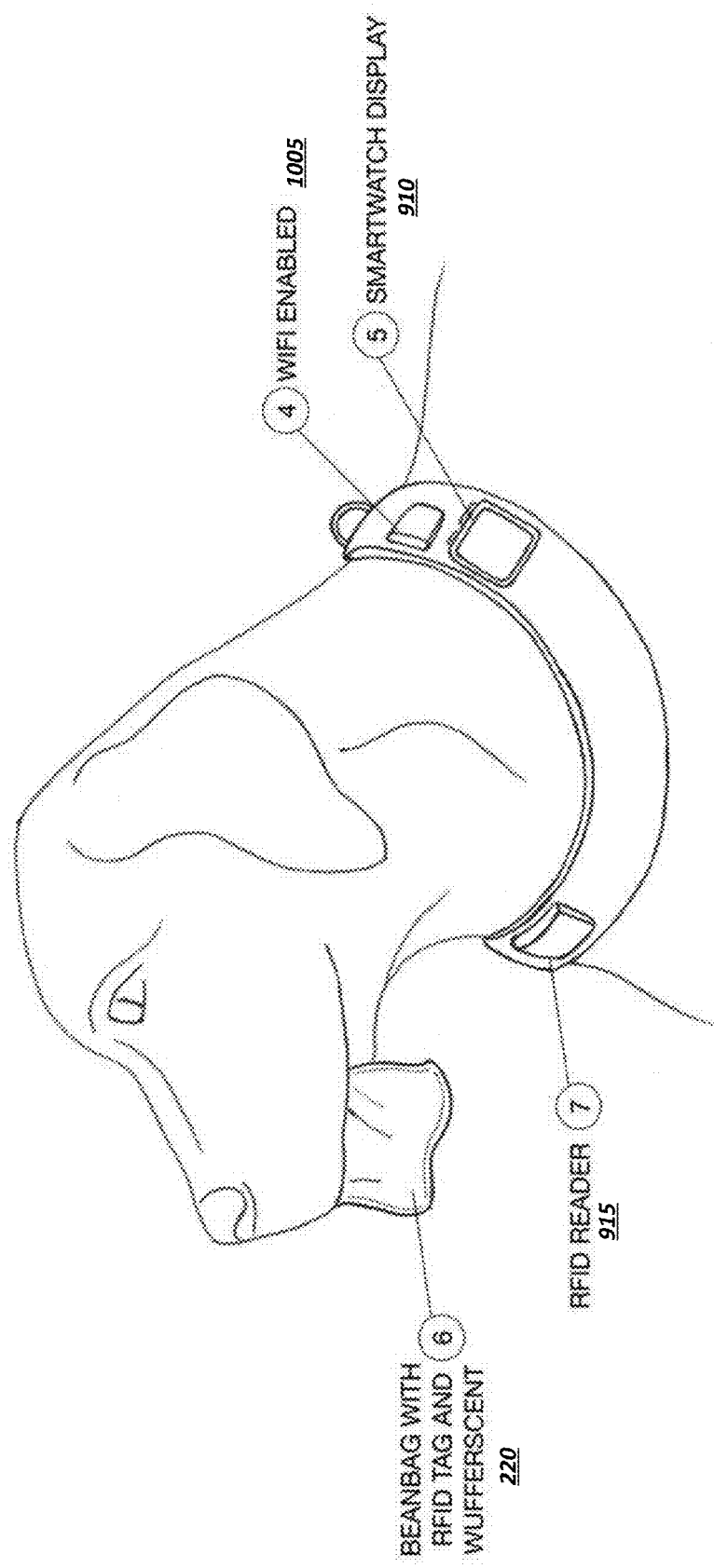
FIG. 10 is a diagram illustrating another example embodiment of a wearable device.

FIGS. 9-10 show additional views of example wearable devices for use in example communication assistance systems. For instance, in addition to conventional mechanisms for attaching the wearable device to the body of an animal, the wearable device may include additional hardware and logic to enable the wearable device to facilitate improved communication of an animal with humans or computing systems (e.g., smart home or other IoT systems) within an environment. Such features may include a speaker 905, a display 910 (e.g., to facilitate programming or monitor functional health of the device 225, etc.), an RFID reader 915 or other sensor to enable the wearable device's identification of the animal's interactions with objects, button boards, etc. (e.g., a camera sensor to identify QR codes, colors, shapes, etc. of an object), among other examples. FIG. 10 shows an example of a wearable device implemented as a smart dog collar, which includes an RFID reader 915 capable of reading RFID tags within communication objects (e.g., 220). The collar may additionally include communication modules (e.g., 1005) to communicate with other computing devices within an environment (e.g., using WiFi, ZigBee, Bluetooth, or other technologies), among other example features and functions.

Figure 11:
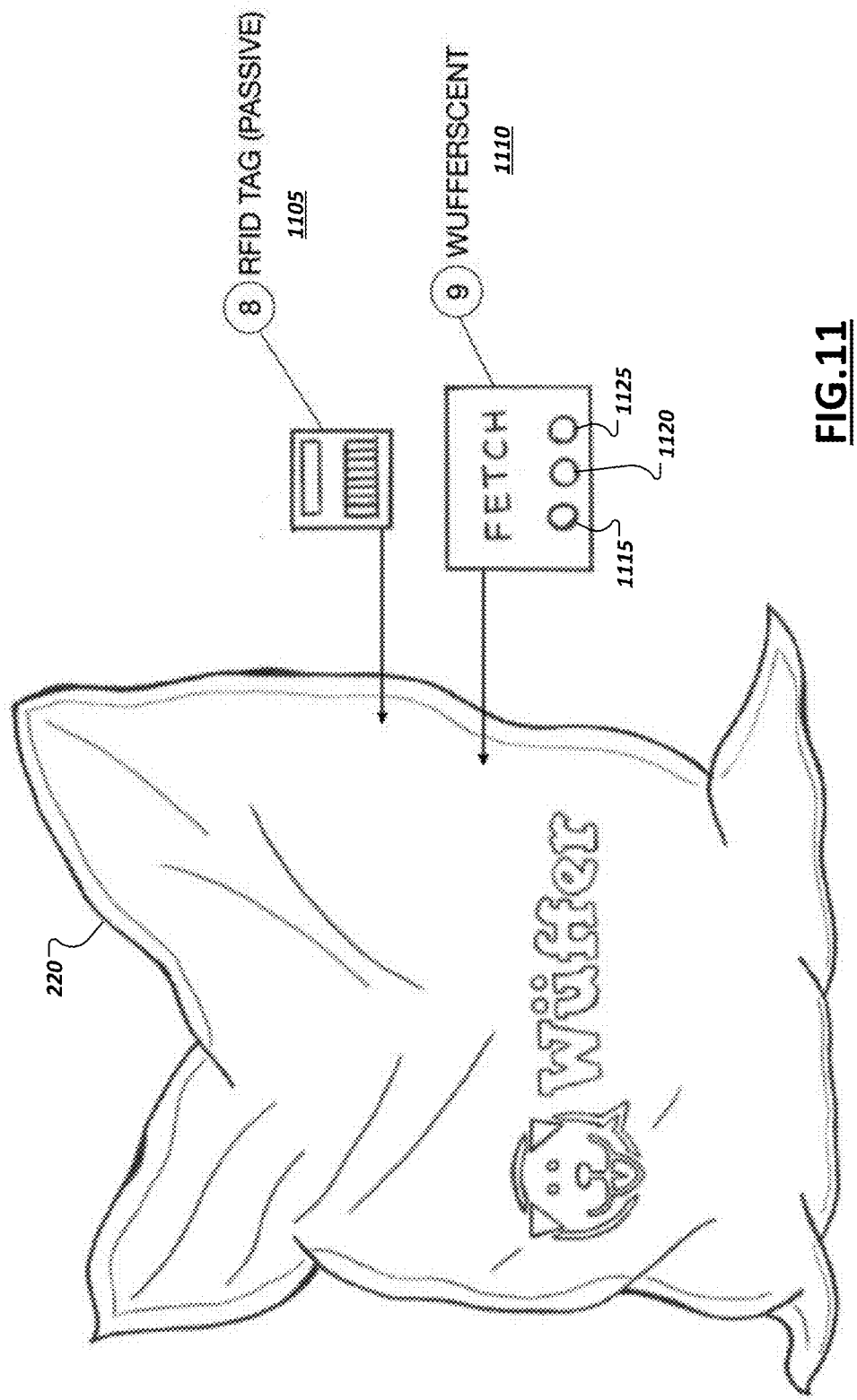
FIG. 11 is a diagram illustrating an example communication object.

FIG. 11 shows an example of a communication object 220 for use within an example communication assistance system. While this example illustrates a beanbag, objects may take potentially any form. The form, printing, shape, or color of the object may be used to assist human users in associating or remembering an association made between the object and a particular meaning or expression to be communicated by an animal using the object 220. The object may include a particular scent marker, which may be natively integrated within the object or may be added to (or programmed for) the object, through the attachment of a scent marker device to the interior or exterior of the object. For instance, scent marker devices may include a scent combination of two or more scents, such as through a card or insert 1110 that includes absorbent elements 1115, 1120, 1135 holding respective scents, which work in combination to provide a scent marker for the object. The object may additionally include an RFID tag 1105 or other computer-identifiable identifier to allow an animal's interactions with the object to be automatically identified and detected.

Figure 12:
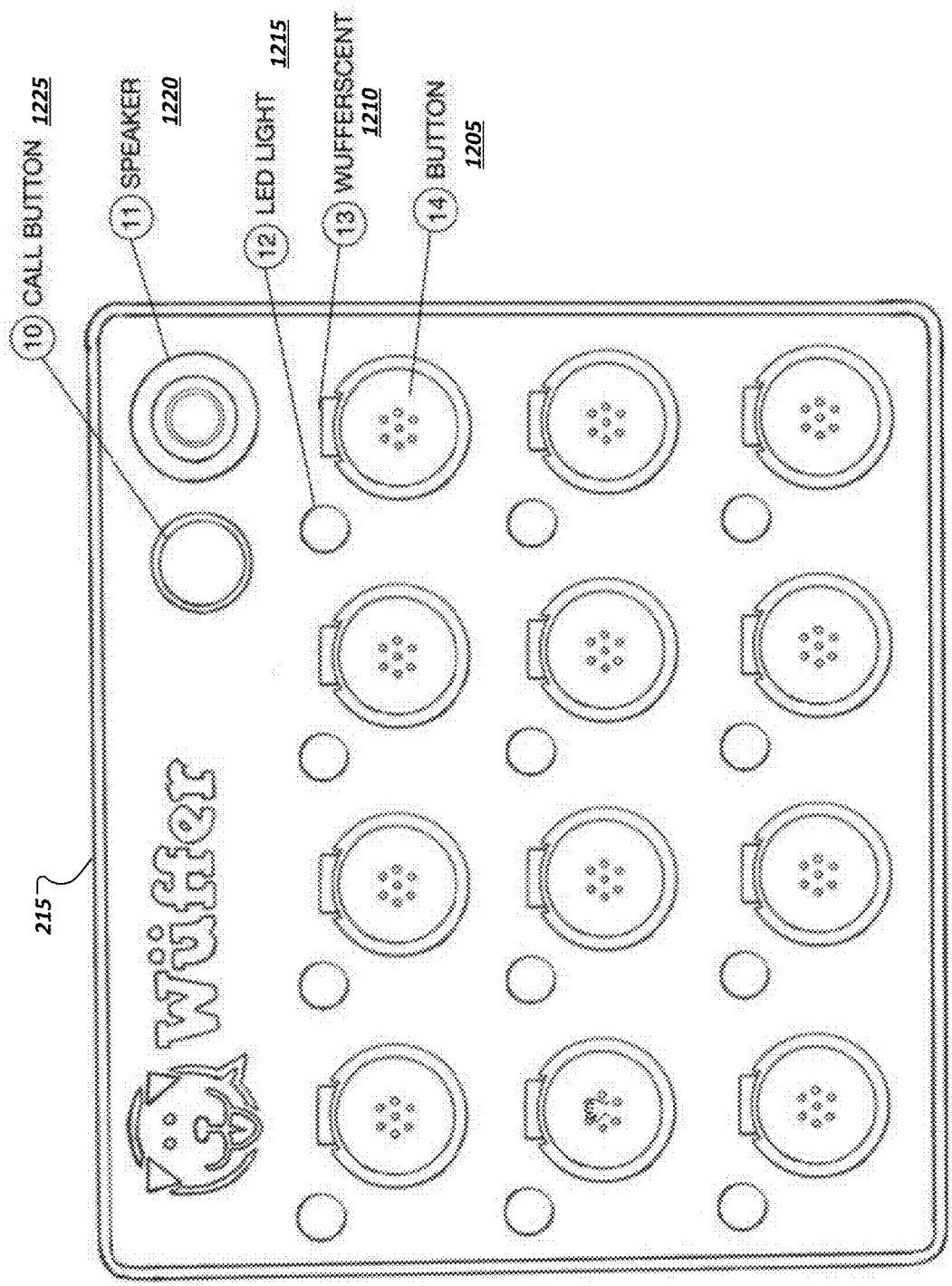
FIG. 12 is a diagram illustrating an example button board device.
Figure 13:
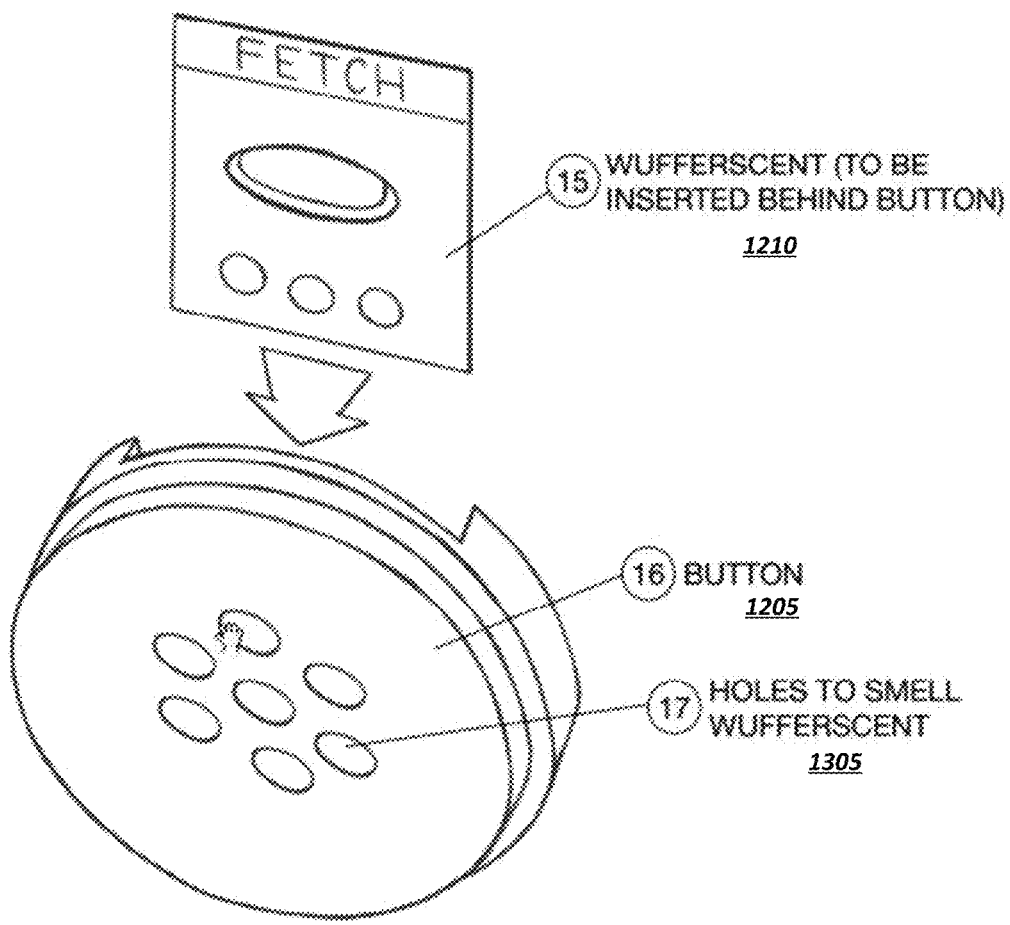
FIG. 13 is a diagram illustrating an example button of a button board device.

FIG. 12 shows another example of a button board. The button board 215 may include elements to allow the button board to convey alerts or messages (e.g., via call button 1225 or speaker 1220), for instance, based on an animal's interactions with one or more buttons on the board 215. The button board 215 may have a number of buttons (e.g., 1205), with each button provided with a unique (for the board) scent marker. In some examples, the buttons may be programmed by a user/trainer by inserting corresponding scent marker devices (e.g., 1210) in the button to provide each button with a scent mapped to an idea or meaning to be conveyed through press of the button (by an animal). Lights or other hardware (e.g., 1215) may be provided to indicate to the animal and/or its humans that a particular button has been pressed. The button board 215 may additionally include components to enable electronic communication with other computing devices within the system, as well as receive data from such supporting computing devices and consume the data, for instance, to generate alerts or other results at the button board. FIG. 13 shows an example of a single button 1205 of an example button board implementation. The button may include holes or openings 1305 to allow a scent (provided by a scent marker device inserted within a pocket or opening of the button) to be more effectively conveyed to the nose of the animal user. For instance, various scent marker cards 1210 may be provided (e.g., and labeled with their corresponding, assigned meanings (e.g., based on a defined hierarchical language construct)), which a user may insert in various buttons of the button board to program the button board with the desired collection and layout of scent marker "words" or "expressions" to build a "vocabulary" of the button board. In this manner, different button boards (e.g., for different environments, households, animal species and breeds), may be composed using different combinations of scent marker inserts (e.g., 1210), among other examples.

Figure 14:
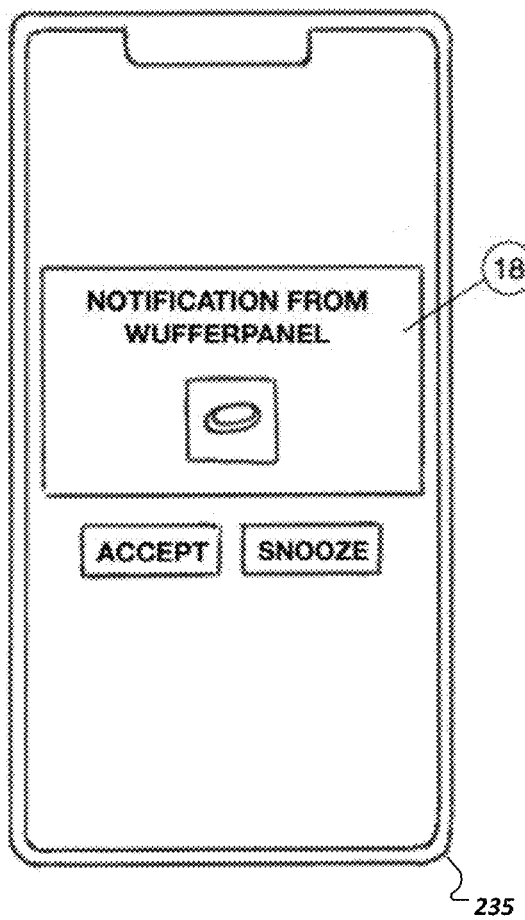
FIG. 14 is a diagram illustrating an example interface of a user computing device with an application for use in a communication assistance system.

FIG. 14 illustrates an example user computing device 235, upon which an application is installed that is configured to interoperate with communication devices (e.g., smart wearable devices, button boards, communication objects, etc.) within a communication assistance system instance. The application may enable and facilitate communication with the communication devices as well as backend services supporting the instance. Additionally, alerts (e.g., 1405) (e.g., audio and/or visual) may be presented to human users via the application (e.g., a "I miss you" communication sent while the human user is away from the home in response to their pet interacting with corresponding objects or buttons with scent markers mapped to the animal longing for the presence of their human companion (e.g., as identified by a smart collar detecting the interaction and communicated to by the smart collar to a gateway device or other local computing device in communication with the smart collar in a local at-home network), among a myriad of other examples.

Figure 15B:
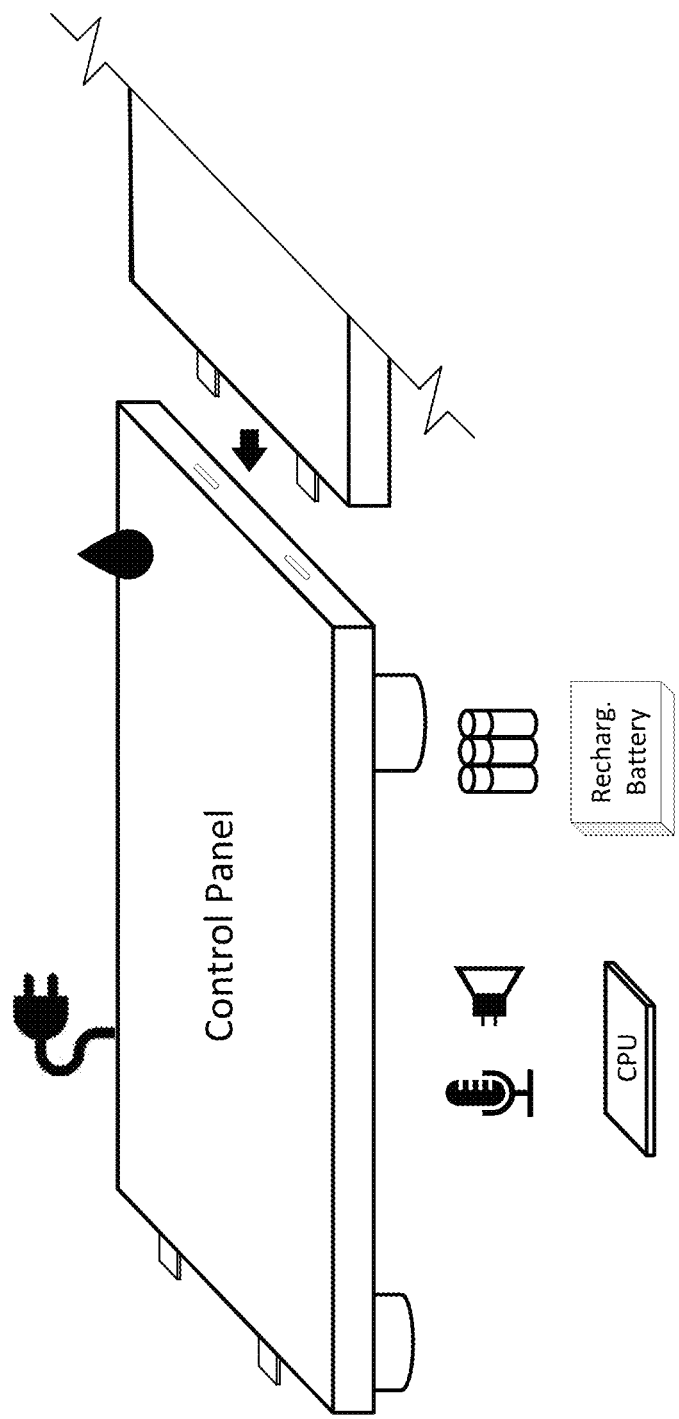
Figure 15C:
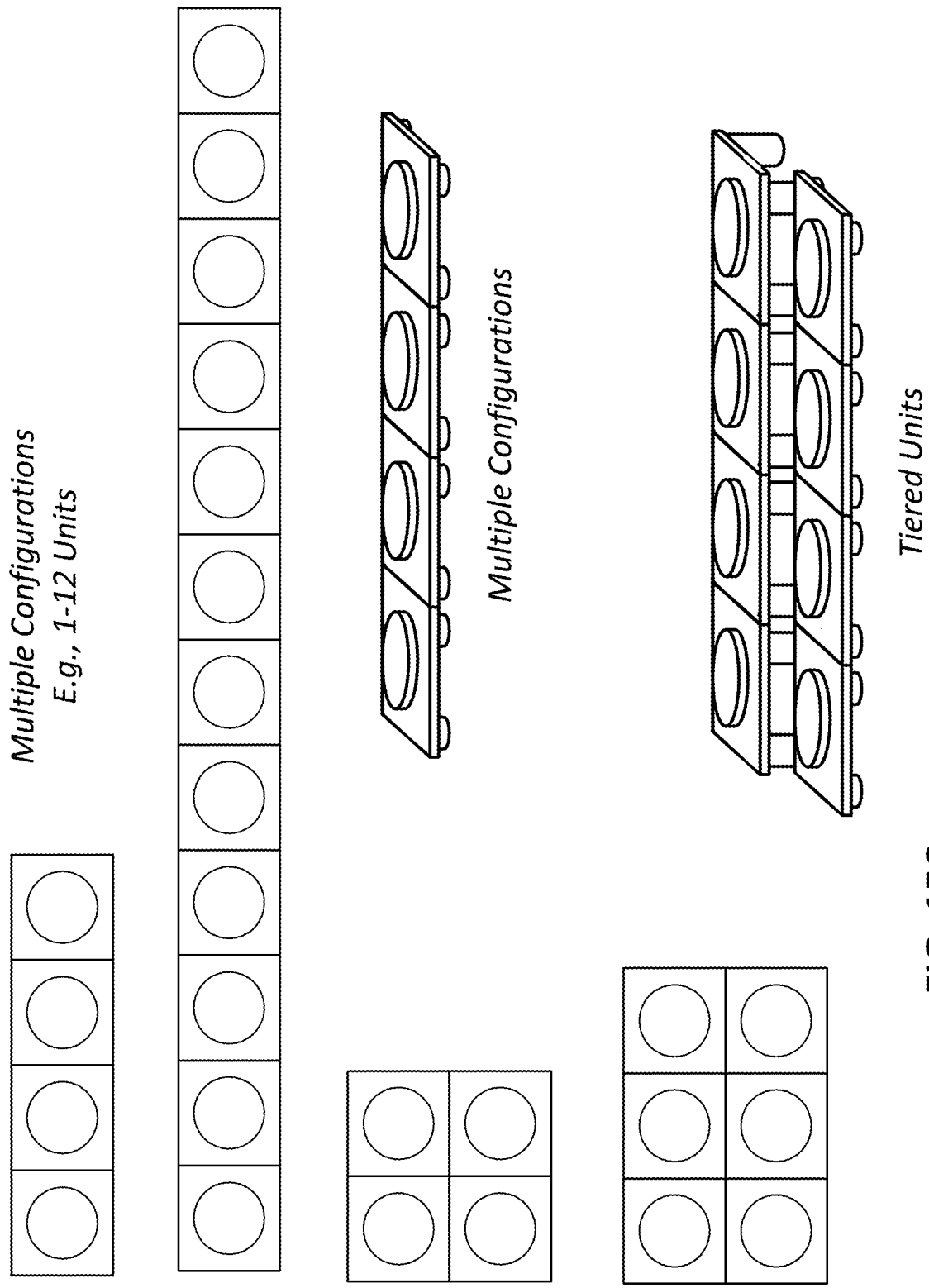

In one example implementation, a button board may be further configurable through a module button board design. For instance, individual buttons may be provided as button modules, such as shown in FIG. 15A, which include hardware mechanisms such as microphones, speakers, and a button, such as in other examples of button board buttons discussed above. Connectors (e.g., male and female USB connectors or other connectors (e.g., using other, non-USB technologies)) may be provided to allow a button module to be connected to and combined with other button modules to form a board of two or more buttons, such as shown in FIG. 15B. FIG. 15C shows various arrangements of button boards which may be constructed from collections of button modules, to allow for customizable arrays and dimensions of buttons in button board implementations customizable to a particular environment or application.

Figure 16A:
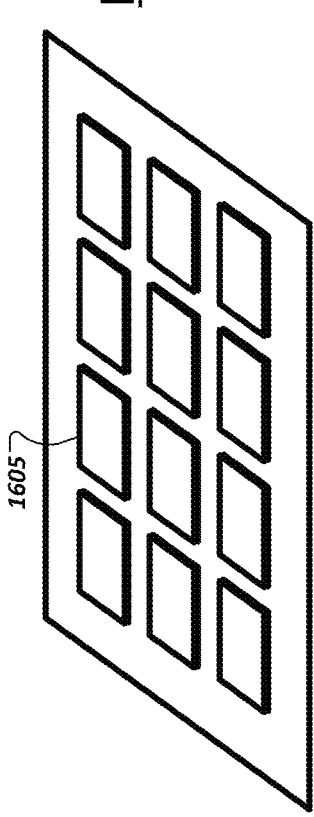
FIGS. 16A-16D are simplified block diagrams illustrating an example button board implemented using a touchscreen display.
Figure 16B:
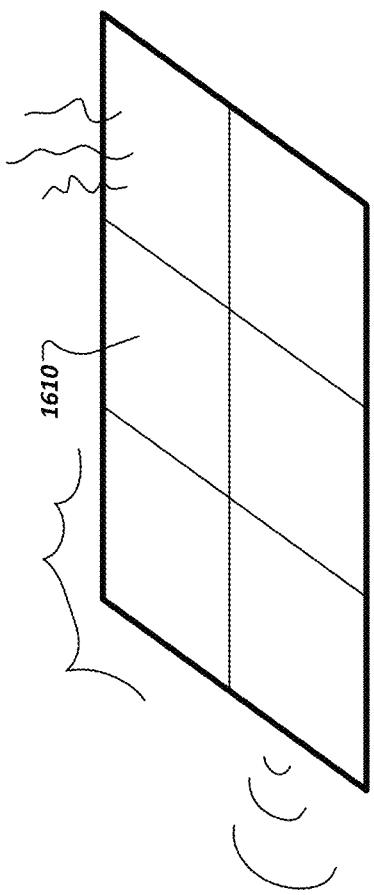
Figure 16C:
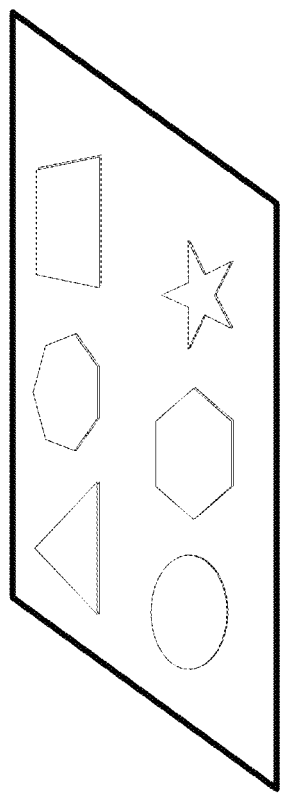
Figure 16D:
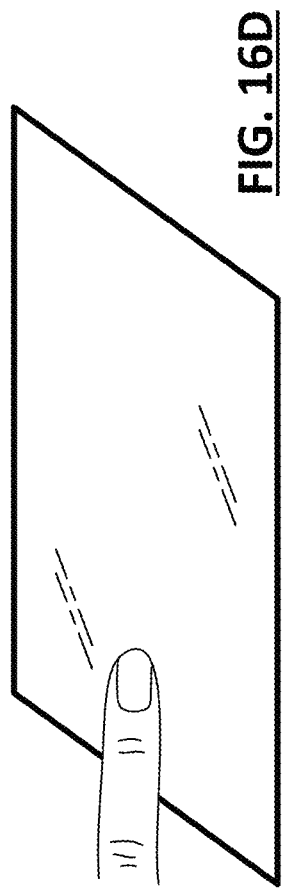

In still other examples, a button board may be implemented using a touchscreen device, with scents applied to particular regions of the touchscreen device via one or more scented overlays (e.g., 1605) (with scent markers mapped to subareas (e.g., 1610) of the touchscreen (as represented in FIGS. 16A and 16B). The native display and touch functionality of the display device may be leveraged to enhance the touchscreen button board implementation, for instance, by presenting representations of the programmed meanings digitally to align with the subareas mapped to respective scent markers (as represented in FIG. 16C), and the touchscreen functionality replacing mechanical buttons (as represented in FIG. 16D), among other example features and functions.

Figure 17A:
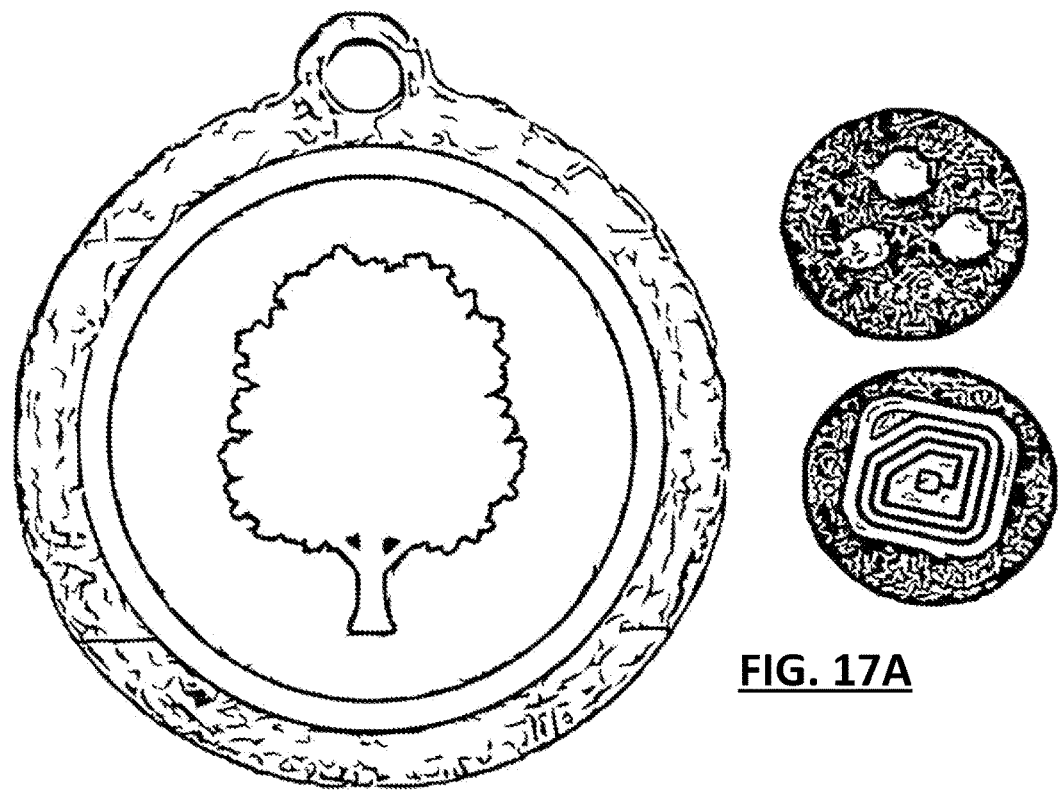
Figure 17B:
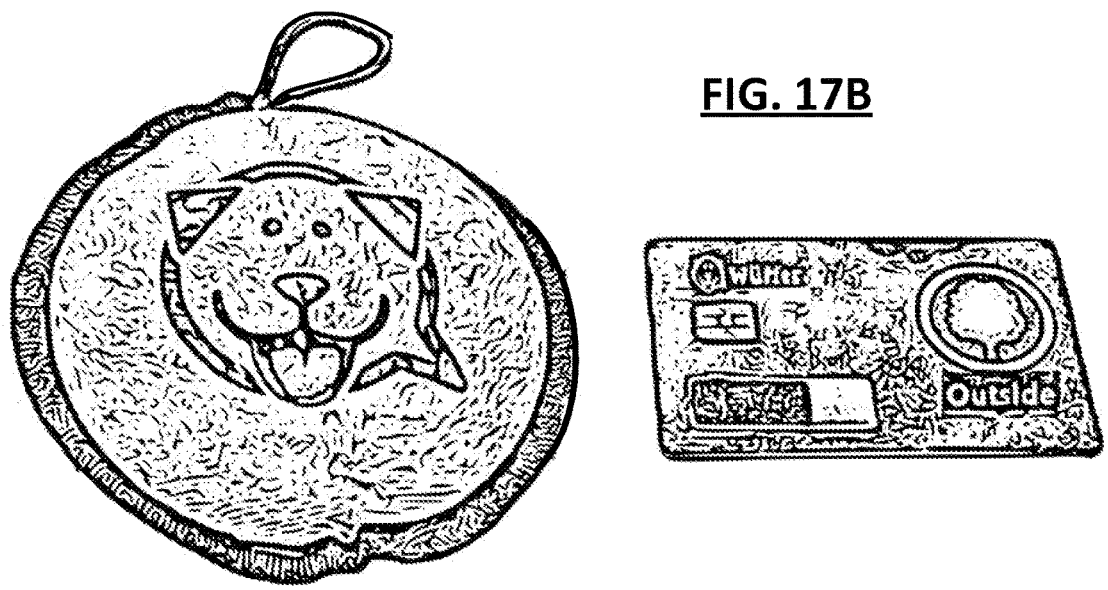
Figure 17D:
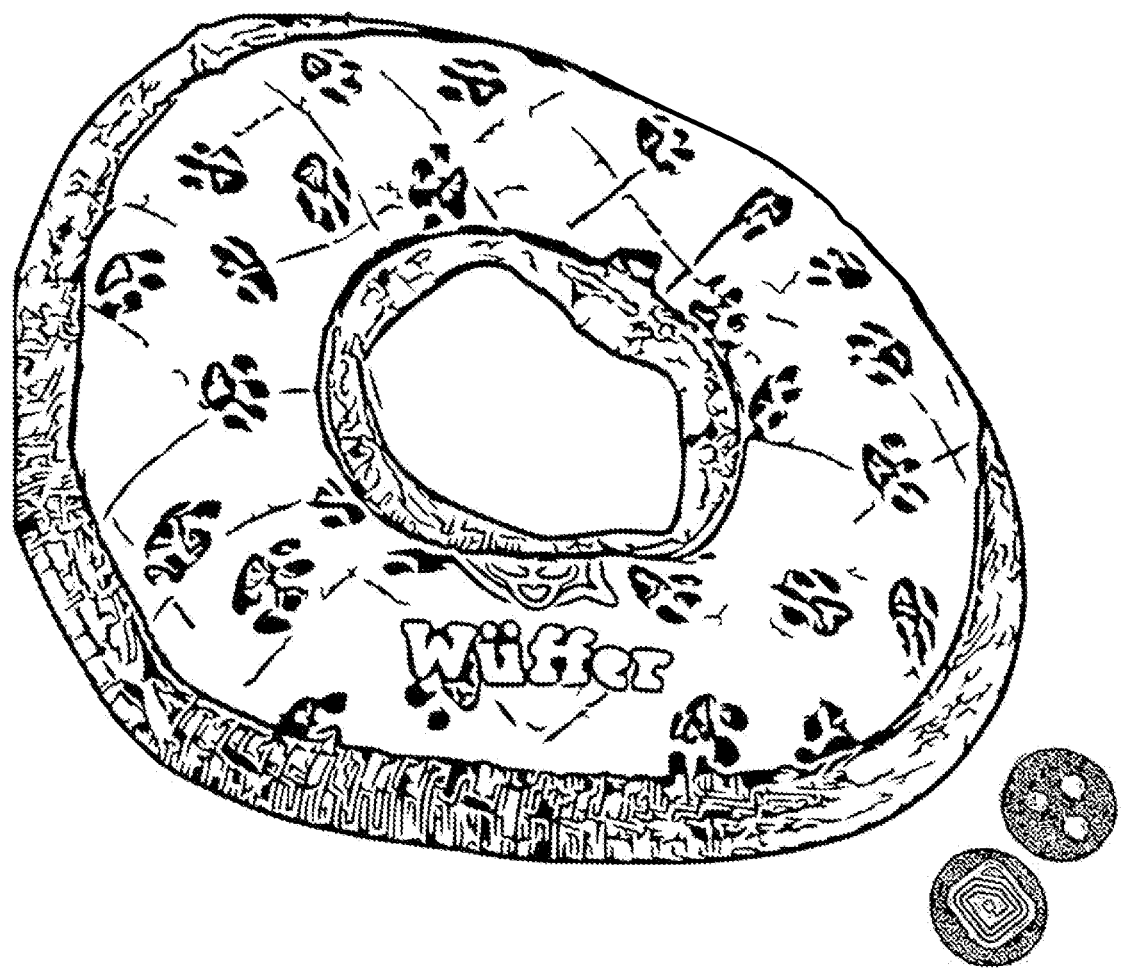

FIGS. 17A-17J illustrate examples of various communication objects, which may be provided and developed (among other examples) for integration and use within an example communication assistance system. For instance, FIG. 17A shows a tag object, which may be hung from various items (e.g., to indicate a location, such as the designated location in the yard for an animal to go potty, or to retrofit an object with a scent marker and corresponding RFID). FIG. 17B shows example beanbag objects, which may include a pocket (e.g., a zipper pocket, pocket with a hook and loop closure, or other closure) into which a scent marker device including a scent marker (mapped to a particular meaning (e.g., the concept of "Outside")), may be inserted to "program" the bean bag (or other object) into which it is inserted to represent this concept. The programmed object may then be identified, by scent (and potentially also by shape/appearance), by the animal to identify that this object may be interacted with to communicate a desire or idea involving things or activities that occur "outside", among other examples.

FIG. 17C shows an example button to be used as a standalone object or in a button board, in which a scent marker device may be inserted to convey meaning to the button and the button's use by the animal. In this example, a scent marker device (labeled "Outside" (for the benefit of the human user/programmer) and having a corresponding scent marker) may be inserted within the button to encourage the animal to press the button, for instance, to indicate (or even automatically actuate (e.g., via a smart door lock)) the animal's desire to go outside, among many other examples (e.g., of buttons and scent markers mapped to a diverse variety of other concepts, actions, and things, which might be communicated through the appropriately programmed button (e.g., via insertion of a corresponding scent marker device).

Figure 17E:
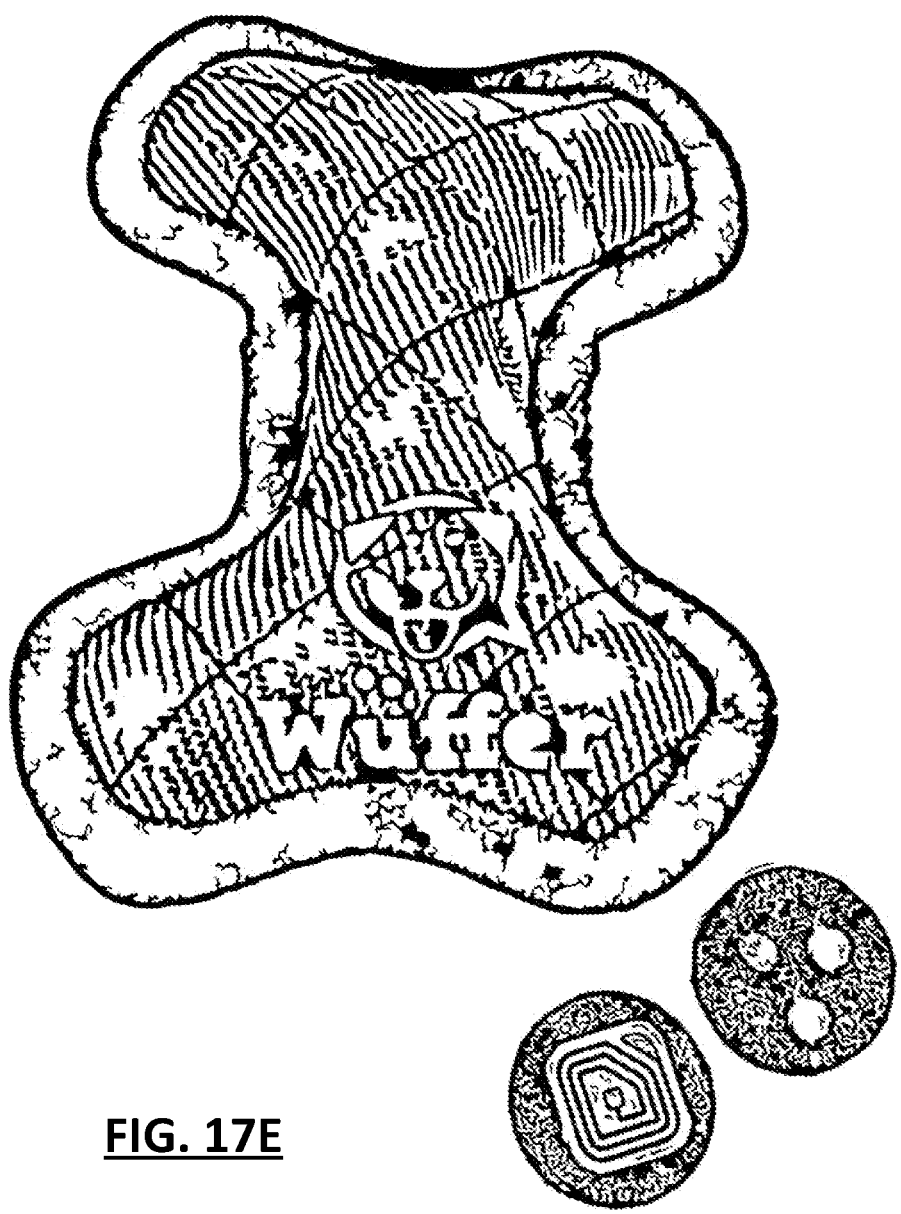

FIGS. 17O-17E show example animal toys, which have respective embedded scent markers and RFID tags within. In some implementations, multiple objects may be provided within an environment with the same scent marker to commonly identify the objects as pertaining to a same or similar concept (e.g., multiple toys marked with a "Play" scent marker), among other examples. In such examples, a scent marker need not necessarily be unique among objects within an environment, as long as the scent marker itself is unique in its mapping to a particular concept or meaning with the animal's vocabulary learned and facilitated through the communication assistance system.

Figure 17F:
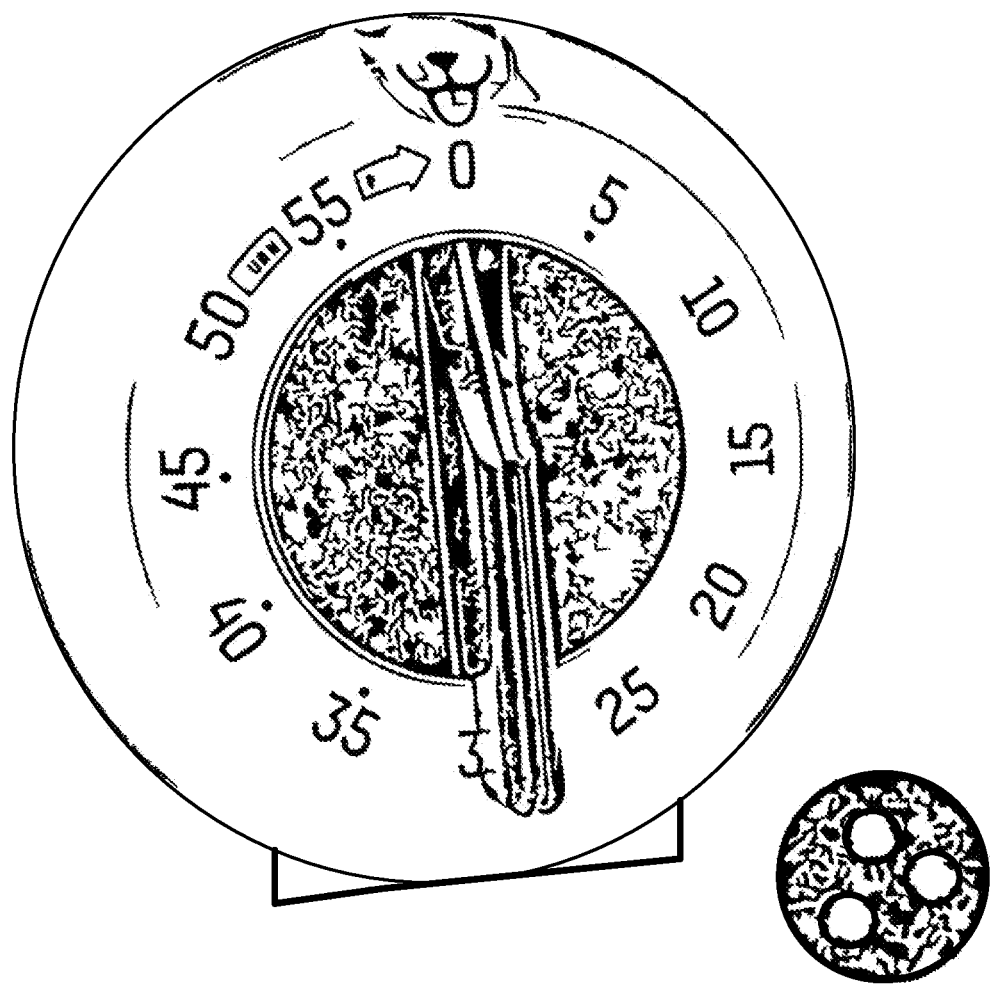

FIG. 17F is a timer device, which may be utilized within a communication assistance system. Animals using the communication assistance system may quickly feel a sense of empowerment upon realizing their ability to communicate more effectively with their human companion(s). However, animals do not possess the same awareness of time and scheduling as their human companions. Accordingly, this enthusiasm may overwhelm the human user and conflict with their own timing and schedule. To assist the animals in understanding timing, a timer device may be utilized (and provided with a corresponding scent marker). The timer may be set in response to an animal's request (communicated via a button board or interaction with a communication object) to communicate to the animal that the animal is to wait until the effect of the animal's communication is granted. In other implementations, the timer may be provided as part of the communication assistance system app, on the wearable device of the animal, among other example implementations.

Figure 17G:
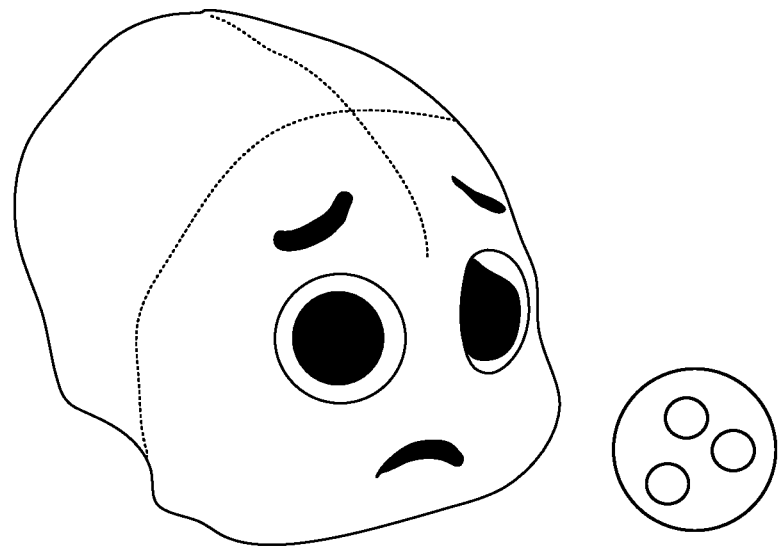

FIG. 17G is an example object formed in the shape of an emoji. A corresponding RFID tag and scent marker may be provided to map the object to a feeling concept corresponding to the emoji (e.g., excited, hurt, relaxed, anxious, love/cuddle, etc.). Accordingly, the animal's interactions with a themed object may additionally communicate its feelings to a human user observing the interaction (with the animal interacting with the object based on the scent marker, instead of the human-understandable emoji).

Figure 17H:
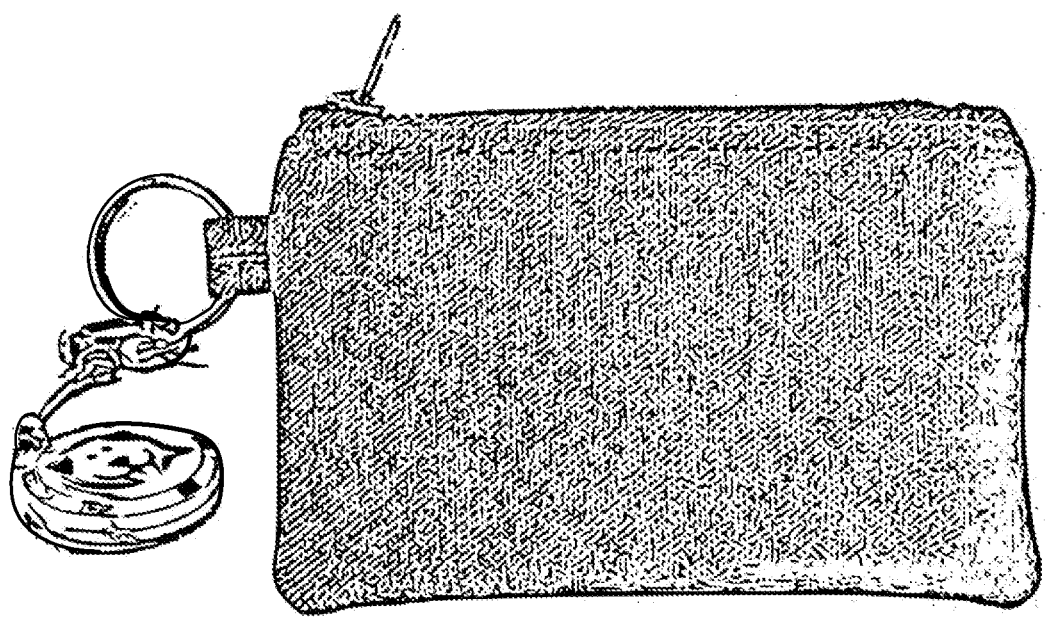
Figure 17I:

In some implementations, objects may be coupled to objects with significance to human users, for instance, to teach and request animals to help the human find or retrieve the object. The human can request that a particular thing be found or retrieved, with the animal finding the object based on the scent marker the animal has come to associate with the human user's command (e.g., "find my keys" can be taught to mean finding a keychain with a particular scent marker, which the human user can connect to their keys as a keychain, among other examples (such as shown in FIG. 17H).

As introduced above, in some implementations, a common "system scent" may be applied in the stimuli-markers for objects and buttons within a communication assistance system. When the animal smells this scent (e.g., alone or in an array of scents making up an individual scent marker), the animal may be taught to understand that an opportunity to learn or engage in communication is available or forthcoming. Accordingly, in some implementations, a hand soap (e.g., illustrated in FIG. 17I) may be developed and provided for use by a human user (e.g., prior to training the animal to use the communication assistance system) to help associate these communication-focused training activities (where the human user's hands now smell like this "system scent") with the system scent.

Figure 17J:
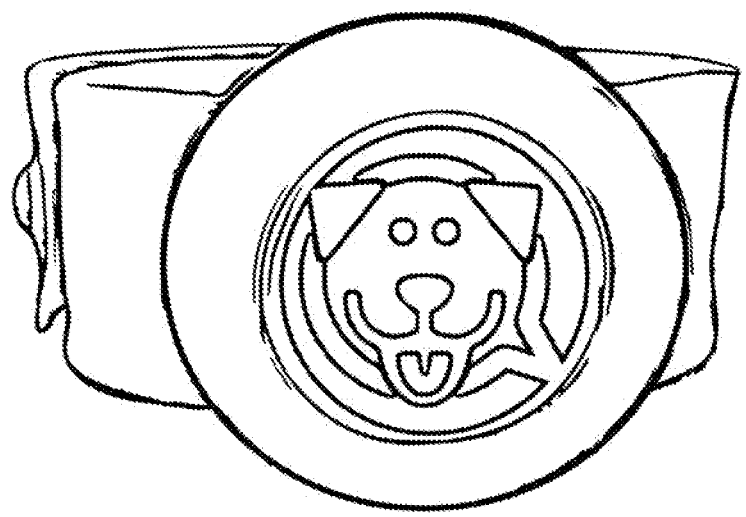

As further introduced above, a scent marker may include category scents coupled with more specific scents. In some implementations, a Pack category scent may be provided that is common in all scent markers defined for the system to indicate a concept associated with the animal's household and family (e.g., of humans and other animals). FIG. 17J illustrates an example wearable, which may be developed to be worn by the members of a household. Each member's wearable may carry a unique scent marker that includes the Pack category scent and a member-specific scent (to build a specific Pack Member scent marker). In this manner, the animal may associate each specific member by their scent, such that communications (e.g., via a button board) can add the "names" of these family members to the animal's vocabulary. For instance, if a dog wishes to interact with or inquire about a specific family member, they may press a button on a button board that maps to the specific member scent marker of that family member in conjunction with another button board press (e.g., "outside" (e.g., to inquire if that member is outside), "play" (e.g., to request to play with that family member), "love" (e.g., to indicate a desire to be cuddled or be shown affection by that family member), among a variety of other meanings, which may be defined during training of the dog), among other examples.

Traditional animal training and communication devices may be enhanced by attaching or incorporating scent markers to these devices. For instance, bells hung from doors are commonly used to teach dogs to ring the bell as a request to go outside. A dog trained within a communication assistance system, may quickly learn how to use various devices by attaching an already learned scent marker (e.g., which the dog already associates with a concept) to understand how a new device is to be used by the animal. For instance, a scent marker for "outside" may be attached to a new bell device hung from a door, to assist the animal in quickly associating interactions with the bell device with requests to go outside, among other examples.

It should be appreciated that the vocabularies that might be learned through various scent marker systems are only limited by the imagination and design of the human users training and imagination (e.g., in developing combinations of scent-based words and "scentences") and reinforcing actions/reactions to be associated with these ideas. Further, such principles may be applied to the training and communication with multiple different breeds of animals as well as species of these breeds. While a language developed using a communication assistance system may be largely unique to the household in which it is implemented, in some implementations, feedback data collected from multiple communication assistance system instances, may be crowdsourced to detect patterns and commonality between the languages individual species or breeds tend to use when implementing their respective communication assistance system instance. Accordingly, "dialects" of similar languages may be identified (e.g., using machine learning) from these varied data sets, from which future or enhanced training and vocabularies may be developed. Indeed, as vocabularies are grown and refined, models for interpreting animals' use of a communication assistance system may also be refined (e.g., via updates to communication models and logic used within the system instances), among other examples.

In some implementations, training of the animal may leverage the ability of the animal (through its enhanced sense of smell) to detect the presence of drugs, explosives, or other illegal substances within a security setting. In other examples, the animal may be trained to identify food safety conditions (e.g., in food being used by a human companion). In other examples, the training of the animal may consider the ability of the animal to detect medical conditions, such as dangerous health conditions within a home, assisted living, or hospital environment, among other examples. For instance, the animal may be trained to associate the positive detection of a condition with a first communication object or button board button (having a first scent marker) and negative detection of the condition with a second communication object or button (having a second scent marker). As an example, a human user may provide a verbal command (or command through presentation of a scented object) to an animal, which requests the animal to indicate (from olfactory stimuli collected from the human user or human subject) whether a particular medical condition is present or not (by indicating the same by picking up a corresponding communication object or pressing a corresponding button board button).

In the case of medical condition detection, training of the animal may include encouraging the animal to recognize scents within its environment that may be indicative of human medical conditions including disease, viruses, or medical conditions (e.g., detection of blood sugar changes in diabetics, certain types of cancer, malaria, narcolepsy, epilepsy, COVID-19, Parkinson's disease, detection of serotonin changes that proceed migraine headaches and others) that are paired with food, praise or other awards when achieving desired behavior. Training may also include testing of the animal's receptive AAC understanding, which is demonstrated by activating a stimulus or stimuli on the communication device without voicing aloud the message or any other external cues. As an example, an animal may be taught that one or a combination of stimuli markers are to map a virus, disease, or other medical condition (e.g., which may be impregnated with an olfactory stimulus marker mapped to the virus "COVID-19"). In To test the animal's understanding, in one example, the trainer lights two buttons without voice, "(person name)" and "Virus." If the dog interprets the stimulus properly, the dog may respond, for instance, by retrieving a scented bag and standing next to the named person, among a multitude of other examples. The trainer then holds the scented bag and encourages the animal to detect the scent. The animal responds by lighting two buttons "(person name)" and "Virus" on a button board, representing a change in the body odor of a human that suggests the presence of the virus. The button board communicates with other communication devices which notify pre-selected contacts. In another example, the human may present a scented object (e.g., bracelet or some other object) representing a request to identify a disease, virus or other medical condition. The animal, wearing a smart collar or other wearable device, retrieves a scented object (e.g., beanbag or other object) representing "Safe" or "Danger." The beanbag or other object is read by the smart collar and communicates with other communication devices which notify pre-selected contacts. For instance, a diabetic person may evaluate (e.g., in conjunction with other test techniques) their insulin and/or blood sugar levels by presenting a scented object (e.g., a bracelet), which represents a request for the animal to evaluate whether the persons "numbers are safe". The animal, in response, may retrieve the corresponding object or press the corresponding button representing "safe" or "dangerous" depending on what the animal detects from the subject person. Such results may be additionally collected by a supporting user computing device and shared with a backend medical service (e.g., corresponding to the person's doctor or medical provider), among other example uses. Indeed, similar workflows may be developed for drug detection, food safety detection, and other applications, among other examples.

Table 1 illustrates principles of the example training of an animal to use an example communication assistance system, with an animal progressing (downward, row-by-row in the table's representation) from preparing to learn to animal-initiated expressive language.

TABLE 1

| System Training Progression | | | | |
|---|---|---|---|---|
| Preparing to Learn Focus | Preparing for receptive learning | Establishing behavior to identify target | Teaching fetch and gentle release | — |
| Using Scent Gross Discrimination | Introducing nose work (scent rather than sight) | Using nose work to determine location (gross discrimination) | Linking a scent to represent an object or action | Introducing a "two-scent" word phrase |
| Practicing Language Fine Discrimination | Identifying a scent among multiple similar scents | Proving scent memory in varied locations | Searching and retrieving requested scent markers | Searching and proving that scent memory links to a specific object |
| Human-Initiated Receptive Language One-Way Communication | Proving scent memorization by retrieving an object after scent prompt (animal receptive) | | Proving scent memorization by completing a series of actions after their corresponding scent prompts | |

TABLE 1-continued

System Training Progression

| | | |
|---|---|---|
| Animal-Initiated Expressive Language Two-Way Communication | Animal initiates request with Human by physical or electronic conveyance of a scent prompt (animal expressive) | Human responds to Animal through verbal or electronic acknowledgement and action (human receptive) |

An example communication assistance system and the training to condition human and animal users to successfully use the system can be based on the principals that: communication partners generally need a common language whether auditory, gestural, print or scented; communication messages and tools need to be time efficient to be chosen over whining, barking, yelling, grabbing; communication partners are usually near each other for visual and auditory messages to be conveyed; long distance communication with communication partners may be effective (e.g., via devices such as phones, tablets, and other computers); and word meanings and varied uses are learned as the common tools are used in varied combinations and locations with shared experiences and outcomes. Within this framework, an example communication assistance system enables a person and animal to develop a common language that is universally used within their routines and easily understood by others who visit with them. Word meanings and varied uses develop as the common tools are used in varied combinations and locations during shared experiences. The universal meanings of the basic tools remain consistent for all users outside of the immediate family pack. In some implementations, the communication assistance system may be provided as a part of a developed universal human-animal scent-based language. This language may be applied even outside of a local environment to allow it to be recognizable when found in new locations like stores or parks. Such systems may be beneficial to an animal based on their desire for the person's attention, friendship, protection and to be useful. The human user is motivated by the desire to strengthen bonds, provide comfort, share time and space with companion who gives love, protection and service, among other example utility and considerations.

Training may be an integral part in implementing an instance of an example communication assistance system. Within the system, a human user may take the alpha roll by requiring attention from animal before giving information or rewards. The human trainer/administrator sets boundaries and routines by example and invitation, controlling access to tools (e.g., communication devices). The animal learns by watching the person to read cues for requested emotional and behavioral responses. The person establishes efficient and memorable communication routines using olfactory, visual, auditory, tactile, and gustatory stimuli.

As discussed above, communication devices may be provided to assist in message delivery between animal and person. For instance, a scented object may be physically delivered to communication partner (animal or person). The scented object may be physically picked up by animal or placed near pet by person to activate the voice on the collar and deliver message to external device (e.g., a user computing device (e.g., smartphone or tablet)). Scented buttons (standalone or incorporated in a button board) may be pushed to activate the voice on the panel by pet or person and deliver message to an external computing device. An external device may provide support and logic, for instance, by sending the remote message to activate the scented button lights and corresponding voiced message. In other examples, a smart collar or other wearable may be provided to operate with the example communication assistance system. For instance, an external computing device (e.g., smart phone) may send a message to the pet's collar to deliver the message auditorily and haptically. Logic within supporting computing devices and systems can be used to assist in autonomous interpretation of word selections for clarification and additional context.

Example training may include use of the communication devices and marker devices discussed above and include eye work (e.g., pet will read gestures, follow finger point and focus on person), search (e.g., when prompted pet will search into spaces and nose touch objects; scent matching (e.g., pet will recall presented scent and find its match even when presented with distractions); search skills (e.g., pet develops a systematic search pattern to cover larger areas); "I found it" behavior (e.g., pet develops a consistent posture or behavior when target is found); nose work and tracking (e.g., pet will search for scent match in a large area with distractions); receptive messaging (e.g., pet will demonstrate knowledge of presented scented objects by reacting correctly to messages received from the person); expressive messaging (e.g., pet demonstrates knowledge and memory of the scented object's meaning by picking up scented objects to express novel message within context; and two-Way Communication (e.g., pet demonstrates knowledge of the established scent-based vocabulary and retention over time through daily use when asking for social interaction or reacting correctly to messages received from person). These outcomes may be developed through techniques such as focus and wait behaviors on cue; targeting with nose touch when cued; daily routines building olfactory scent bank (e.g., for "Discovery Scents" outside, potty, eat, inside, and "mine" (pet's things), etc.); tracking Behaviors; and learning to use (engage and respond to) mobile scented communication objects that connect to devices (e.g., via RFID detection). Such communication objects may be used to model and practice combining words to create novel message, person to animal to express clear scented message and animal to person to express ideas. Communication objects may also be used to deliver messages (over wide area communication networks) when communication partner is away from interactions with buttons or communication objects, such as "Eat," "Help/look at me", "Love," "Potty," "Outside" request, social requests, among others.

The flowcharts and block diagrams in the Figures illustrate the architecture, functionality, algorithms, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   receiving data over a wireless communication channel from a computing device, wherein the data identifies an interaction by an animal with a communication device, and the computing device comprises a smart collar worn by the animal, wherein the communication device comprises a plurality of scent elements, each of the plurality of scent elements comprises a different respective different scent, and a combination of the scents of the plurality of scent elements produces a combined scent, wherein the combined scent implements a scent marker, and the interaction is based on the scent marker;
   determining a meaning associated with the scent marker;
   determining a communication by the animal based on the interaction based on the meaning; and
   generating communication data to identify the communication.

2. The method of claim 1, wherein the data is received over a wireless communication channel from the computing device, and the computing device detects the interaction.

3. The method of claim 1, wherein the communication device comprises a mobile object within an environment.

4. The method of claim 3, wherein the mobile object comprises a radio frequency identifier (RFID) tag, and the smart collar comprises an RFID reader, and the interaction is detected based on detection of the RFID tag by the RFID reader.

5. The method of claim 3, wherein the mobile object is one of a plurality of mobile objects in the environment, and each one of the plurality of mobile objects has a respective scent marker associated with a respective meaning.

6. The method of claim 1, further comprising sending the communication data to the computing device, wherein the computing device is to use the communication data to generate an alert at the communication device based on the communication data.

7. The method of claim 1, further comprising:
   receiving second data identifying interaction of the animal with a second communication device, and the second communication device comprises a different second scent marker;
   determining a meaning associated with the second scent marker, wherein the communication by the animal is determined based on both the interaction and the second interaction.

8. The method of claim 1, wherein the meaning is determined based on a communication model data structure.

9. The method of claim 1, wherein the meaning comprises one of an action, a feeling, a location, or a concept.

10. The method of claim 1, wherein the animal comprises one of a dog, horse, or cat.

11. An apparatus comprising:
    a button board comprising:
       a data processor;
       a plurality of buttons, wherein each of the plurality of button comprises a respective one of a plurality of scent elements; and
       hardware to identify that an animal has interacted with one or more of the plurality of buttons, wherein each of the plurality of scent elements comprises a different respective scent, and a combination of the scents of the plurality of scent elements produces a particular combined scent at the button board, wherein the combination of scents implements a scent marker associated with a meaning; and
       communication hardware to communicate information to identify interaction of the animal with the one or more of the plurality of buttons.

12. The apparatus of claim 11, wherein the interaction comprises interaction with a combination of the plurality of buttons corresponding to the combination of scents, and the information identifies the interaction with the combination of the plurality of buttons.

13. A system comprising:
    a computing device; and
    a smart collar to be worn by an animal and couple to the computing device via a wireless network, wherein the smart collar is to:
       detect that an animal has interacted with a particular scented device, wherein the particular device is one of a plurality of scented devices in an environment, the particular scented device comprises a plurality of scent elements, wherein each of the plurality of scent elements comprises a different respective scent, and a combination of the scents of the plurality of scent elements produces a particular combined scent at the particular scented device, wherein the combined scent implements a scent marker associated with a meaning;
       generate data to identify the detected interaction of the animal with the particular device; and
       send the data to the computing device, wherein the computing device is to process the data to determine an attempted communication by the animal based on the interaction with the particular device, wherein the attempted communication incorporates the meaning.

14. The system of claim 13, further comprising the particular scented device.

15. The system of claim 14, wherein the plurality of scent elements are provided on one or more scent marker devices, and the one or more scent marker devices are removable.

* * * * *